US006928262B1

(12) United States Patent
Kanemitsu

(10) Patent No.: US 6,928,262 B1
(45) Date of Patent: Aug. 9, 2005

(54) BROADCAST RECEIVING DEVICE

(75) Inventor: Hiroyuki Kanemitsu, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 670 days.

(21) Appl. No.: 09/703,678

(22) Filed: Nov. 2, 2000

(30) Foreign Application Priority Data

Nov. 19, 1999 (JP) ................................. 11-329404

(51) Int. Cl.[7] ............................................. H04N 7/16
(52) U.S. Cl. ................... 455/3.06; 455/3.01; 455/3.05; 455/12.8; 455/414.3; 348/14.01; 348/14.02
(58) Field of Search ............................... 455/2.01, 3.01, 455/3.02, 3.03, 3.04, 3.06, 414.1, 414.2, 455/414.3, 414.4, 427, 11.1, 12.1, 566; 379/101.01, 379/102.01, 102.02, 102.03, 93.13, 93.12, 379/93.15, 93.17, 92, 93; 348/14.02, 14.01, 348/14.05, 91, 211.99, 211.1, 211.5

(56) References Cited

U.S. PATENT DOCUMENTS

| | | | | |
|---|---|---|---|---|
| 6,005,562 A | * | 12/1999 | Shiga et al. ................. | 345/721 |
| 6,029,195 A | * | 2/2000 | Herz ........................... | 725/116 |
| 6,169,543 B1 | * | 1/2001 | Wehmeyer ................... | 725/47 |
| 6,421,675 B1 | * | 7/2002 | Ryan et al. .................. | 707/100 |

FOREIGN PATENT DOCUMENTS

| | | | | |
|---|---|---|---|---|
| JP | 8-289214 | 11/1996 | | |
| JP | 9-83891 | 3/1997 | | |
| JP | 10-200431 | * 7/1998 | ............ | H04B 1/16 |
| JP | 11-220703 | * 8/1999 | .......... | H04N 7/025 |

* cited by examiner

*Primary Examiner*—Nick Corsaro
*Assistant Examiner*—Alan T. Gantt
(74) *Attorney, Agent, or Firm*—Finnegan, Henderson, Farabow, Garrett & Dunner, LLP

(57) ABSTRACT

A broadcast receiving device which clearly indicates supplementary information transmitted along with broadcast content, and which facilitates program search. The supplementary information may be a program sequence information of a digital broadcast. Plural types of topic information related to a broadcast content description and a genre of a broadcast content are designed in the supplementary information. A memory device stores, separately for each genre, a display priority degree for each of the plural types of topic information. A control processor obtains genre information and topic information items from an acquired supplementary information. The control processor indicates the topic information items on a display according to the display priority degrees stored in the memory device corresponding to the obtained genre information. When indicating a search screen image, the topic information items are extracted from the supplementary information as search keywords and indicated to the user in the screen image.

21 Claims, 27 Drawing Sheets

| PRIORITY RANKING | GENRE | | | | |
|---|---|---|---|---|---|
| | MUSIC | NEWS | SPORTS | MOVIES | WEATHER FORECAST |
| 1 | SONG TITLE | CATEGORY | PLAYER | TITLE | WEATHERCASTER |
| 2 | ARTIST | NEWSCASTER | | CAST | |
| 3 | SONGWRITER | | | DIRECTOR | |
| 4 | COMPOSER | | | SCRIPTWRITER | |
| 5 | ARRANGER | | | COUNTRY OF PRODUCTION | |
| 6 | | | | DISTRIBUTION AGENCY | |
| 7 | | | | PRODUCTION YEAR | |
| 8 | | | | DUBBING CAST | |

Fig. 21

BROADCAST RECEIVING DEVICE

BACKGROUND OF THE INVENTION

1. Field of the Invention

The present invention relates to a broadcast receiving device, and particularly to a device including a function for receiving supplementary information transmitted along with a broadcast content. Preferably, the supplementary information is a sequence information standardized in digital broadcast.

2. Description of the Related Art

Satellite, ground television, and ground radio are known forms of digital broadcasting. Furthermore, progress is being made in the development of commercial digital music broadcasting for mobile devices.

In digital broadcasting, it is preferable to transmit, together with broadcast content, supplementary information for informing the audience of the broadcast content, as in an EPG (electric program guide). Concerning this supplementary information, "Program Sequence Information Used in Digital Broadcast" (ARIB STD-B10) has been determined as the standard to be adopted by the Association of Radio Industries and Businesses.

The function of program sequence information corresponds to that of TV and radio guides such as appear in newspapers. The program sequence information in the form of, for example, a displayed information on a monitor of a receiving device, is used by the receiving audience for selecting among programming. The program sequence information may include a program title as a short format descriptor and a program genre as a content descriptor. The program sequence information may further include as an extended format descriptor a topic information describing the program content. Plural types of topic information (descriptive information provided for each topic) can be designated in an extended format descriptor.

In a device including a function for receiving supplementary information such as a program sequence information, it is desirable to enhance the ease of viewing the supplementary information, and to facilitate manipulation for selecting a program using the supplementary information. Especially in small-size receivers such as vehicle-mounted and portable receivers, improved display visibility and operability as mentioned above are desired because there exist limitations on the size of the display screen and the space available for manipulation means such as a keyboard.

SUMMARY OF THE INVENTION

The present invention was conceived in the above light. A main object of the present invention is to improve clarity of indication when displaying supplementary information. As explained above, the supplementary information may include plural topic information describing a program. When a variety of topic information is simply listed on a display, especially on a small-size display, the display image becomes complicated and fails to facilitate a quick grasping of an overall view programming. In such a case, the topic information becomes inconvenient to users. The present invention aims to solve this problem.

Another main object of the present invention is to facilitate manipulation for program selection. When searching for a program, the user must input a search keyword. However, the manipulation for inputting a search keyword using a keyboard can be troublesome. In a small-size device such as a vehicle-mounted or portable device, space considerations are not conducive to the installation of a keyboard. Although it is possible to provide functions equivalent to those of a keyboard using a fewer number of buttons, as is known, such an arrangement requires a more complicated manipulation. A purpose of the present invention is to solve this problem by allowing input of an appropriate search keyword through a simple manipulation.

To accomplish the above objects, a broadcast receiving device of the present invention comprises a supplementary information acquiring means for acquiring supplementary information transmitted together with broadcast content, a display means for displaying the supplementary information, a processing means for processing the supplementary information for displaying on the display means, and a memory means for storing, separately for each genre of broadcast contents, a degree of display priority for each of plural types of topic information related to description of a broadcast content. The processing means obtains genre and topic information from the acquired supplementary information, and displays the topic information on the display means according to the degree of display priority stored in the memory means corresponding to the obtained genre information.

The present invention as described takes advantage of the following factor. Plural types of topic information are input for each program from the supplementary information. The value for a user, such as importance and usefulness, of displaying an information differs among topics. Furthermore, ranking of display values of plural topics differs depending on the program genre.

Accordingly, separately for each genre, a degree of display priority for each of the plural types of topic information is designated according to the display value, and the topics are indicated in accordance with the priority degrees. For example, the topic information to be displayed may be limited to only information having higher priority. Arrangement and display emphasis according to the priority degree may also be preferable. In this way, according to the present invention, useful information appropriate for the program genre can be displayed by precedence, and display image can be arranged for clear indication.

Preferably, the memory means stores, separately for each program genre, a priority ranking table for defining the ranking of display priority for plural topics.

The broadcast receiving device of the present invention preferably includes a manipulation means for allowing a user to input his/her selection of a topic to be displayed, and changes a display priority degree stored in the memory means according to the number of times of topic selection by the user. According to this aspect, the present invention can be adapted to individual users having different values towards each topic, offering information useful for each user. This is accomplished based on the fact that typically a user of a receiver repeatedly selects information which most highly suits his or her interests and tastes. A number of selection may favorably be expressed as a selection frequency.

The processing means preferably estimates the genre based on the topic information when the supplementary information does not include a genre information, and displays the topic information according to the display priority degree based on the estimated genre. According to this aspect, an appropriate display can be indicated even when the genre is not identified from the supplementary information, by using the relationship between topic information and genre.

The processing means preferably includes a search processing means. The search processing means allows a program search screen image to be displayed on the display means. In the program search screen image, the topic information included in the supplementary information is arranged, as search keywords, in order from the highest degree of display priority. According to this aspect, information highly valuable to the user is displayed by precedence, thereby quickly offering an appropriate indication.

In another aspect of the present invention, the broadcast receiving device comprises a supplementary information acquiring means for acquiring supplementary information transmitted together with a broadcast content, a display means for displaying the supplementary information, and a processing means for processing the supplementary information for displaying on the display means, wherein the processing means includes a search processing means. The search processing means extracts from the supplementary information search keywords for searching a program, and allows a program search screen image including the extracted search keywords to be displayed on the display means. Furthermore, the search processing means operates so as to indicate, on the display means, a search result screen image obtained through a program search using a search keyword selected by a user. The search processing means preferably extracts as the search keywords the topic information that are included in a supplementary information and related to description of a broadcast content.

According to the present invention, search keywords are extracted from the supplementary information and indicated to the user on the search screen image. The user may select a desired search keyword simply by manipulating the search screen image. In this way, troublesome manipulations such as typing of a keyword using a keyboard can be eliminated, facilitating search manipulation and, accordingly, program selection.

Preferably, when a user instructs a search while topic information related to a broadcast content description is displayed, the display image switches to a program search screen image including the topic information as a search keyword. In this way, the user can easily start a search from the topic information indicating screen image.

The present invention preferably includes a keyword memory means for automatically storing as a search keyword a topic information included in a supplementary information corresponding to a program received for listening and/or watching. The keyword memory means preferably performs the storing process by correlating the topic information with a keyword priority degree according to a number of times of topic information extraction. Furthermore, the search processing means preferably displays stored topic information on the program search screen image according to the keyword priority degrees. For example, the topic information is displayed in an order according to the keyword priority degrees.

According to the present invention, search keywords are automatically stored and later read out for use. In this way, a greater number of search keywords become available for use by a user without manipulating a keyboard or the like. By reflecting the number of extractions in a keyword priority degree, search keywords appropriate for each user can be offered.

Preferably, the broadcast receiving device of the present invention further includes a keyword mode switching means. The keyword mode switching means switches between a receiving program keyword indicating mode in which a topic information in the supplementary information corresponding to the program presently received for listening and/or watching is displayed as a search keyword on the program search screen image, and a registered keyword indicating mode in which a topic information stored as a search keyword in the keyword storing means is indicated on the program search screen image.

According to the present invention, keywords related to the presently receiving program and keywords related to a program received for listening and/or watching in the past are indicated as the keywords likely to be requested by the user. In this way, appropriate keywords can be offered according to each user. Furthermore, keywords can be offered appropriately and plentifully even on a small display screen of a vehicle-mounted or portable device.

In the present invention, the supplementary information preferably is program sequence information for a digital broadcast. The supplementary information may include an extended format event descriptor, a content descriptor, and a short format event descriptor. Topic information can be obtained from an extended format event descriptor, while a program genre can be obtained from a content descriptor. Useful information can be offered using the supplementary information standardized in digital broadcast, without employing a separately assigned supplementary information for exclusive use.

The present invention are not limited to aspects configured as a receiving device. Another aspect of the present invention is, for example, a broadcast receiving method. The present invention may also be implemented as a memory device storing a program for allowing a computer to process a received broadcast signal.

BRIEF DESCRIPTION OF THE DRAWINGS

FIG. 21 shows a display priority ranking table.

DESCRIPTION OF PREFERRED EMBODIMENT

A preferred embodiment (hereinafter referred to as the embodiment) of the present invention will now be described referring to the accompanying drawings.

Figure 1:
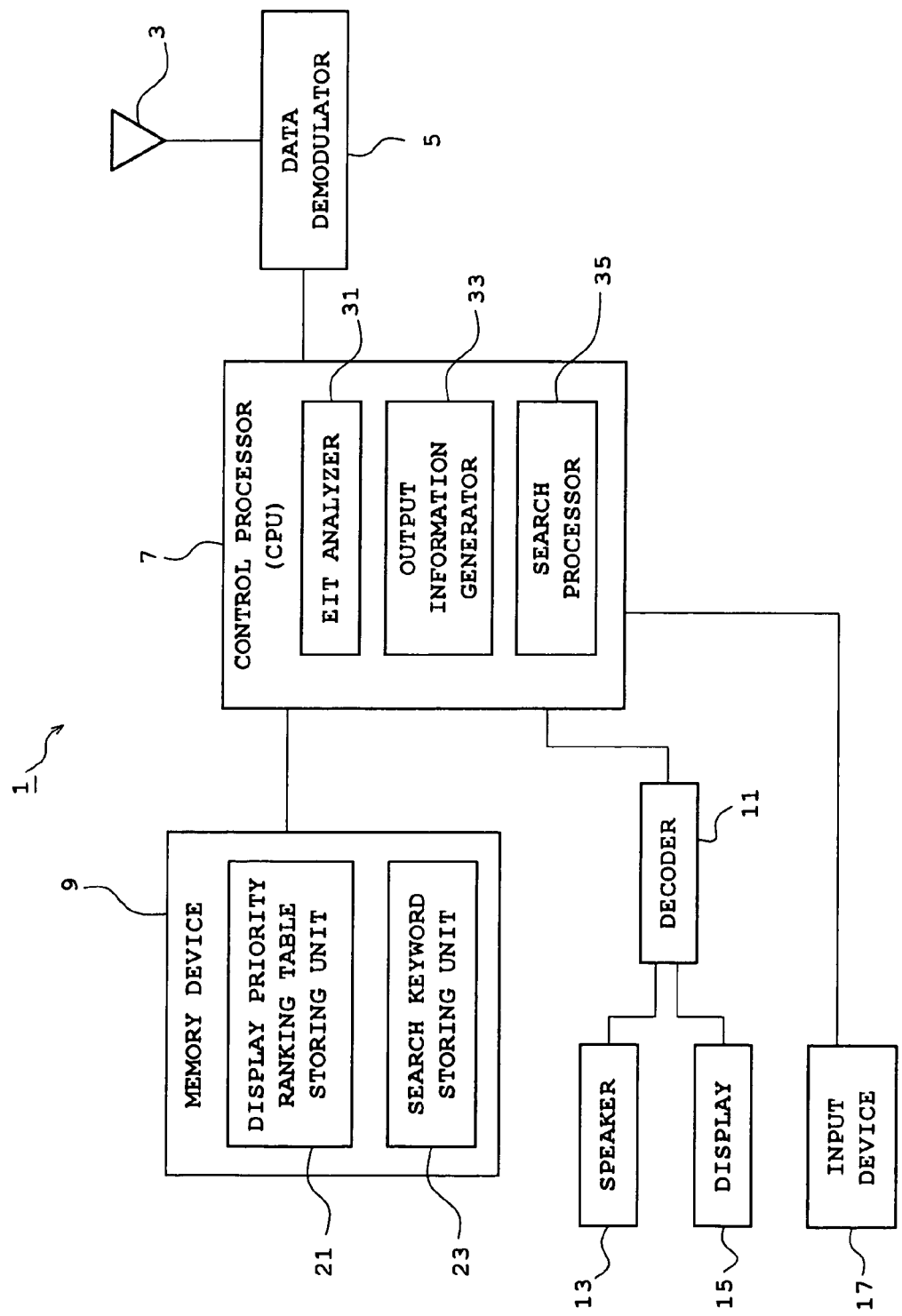
FIG. 1 is a block diagram illustrating the overall configuration of a broadcast receiving device according to a preferred embodiment of the present invention.

FIG. 1 is a block diagram illustrating the overall configuration of a broadcast receiving device according to the present embodiment. In the present embodiment, the present invention is implemented in a digital broadcast receiver mounted on a vehicle.

In FIG. 1, the broadcast receiving device 1 comprises an antenna 3 for receiving a digital broadcast signal, a data demodulator 5 for demodulating the broadcast signal received by the antenna 3 into digital data, a control processor 7 for controlling the entire receiver, a memory device 9 for storing various data necessary for processing in the control processor 7, a decoder 11 for generating an audio signal and a video signal for output, a speaker 13 and display 15 for outputting the audio signal and the video signal, respectively, and an input device 17 for manipulation by a user.

A digital broadcast signal transmitted to the broadcast receiving device 1 includes broadcast content information (hereinafter referred to as content information) and supplementary information.

Content information is, for example, music data in a music broadcast, or image and sound data in a television broadcast. The content information is demodulated in the data demodulator 5. Subsequently, under control of the control processor 7, signals for output are generated in the decoder 11 from the content information, and output via the speaker 13 and the display 15.

The supplementary information conveys to the audience information regarding the type of broadcast. In the present embodiment, program sequence information, which is one form of supplementary information, is used. As stated above, the standard specification is determined for program sequence information under "Program Sequence Information Used in Digital Broadcast" (ARIB STD-B10) by the Association of Radio Industries and Businesses. According to this standard, an EPG (electric program guide) can be generated from an EIT (event information table).

EIT information is received via the antenna 3 at a predetermined interval (every 2 seconds, for example). After being demodulated by the data demodulator 5, the EIT information is processed by the control processor 7 (corresponding to the processing means of the present invention). The control processor 7 analyzes the EIT information and extracts necessary information. In response to user manipulation of the input device 17, information that should be displayed is obtained from the EIT information. The obtained information is processed for output, transmitted to the decoder 11 to be converted into a video signal, and indicated on the display 15.

The EIT information includes information corresponding to the so-called TV and radio guides on a newspaper. For example, one stream of EIT information may include information for plural channels within the stream, regarding the program schedule for each channel and the content of each program. The receiving device and the broadcast system may be configured to acquire information for plural streams (information for the presently receiving stream and non-receiving streams).

Figure 2:
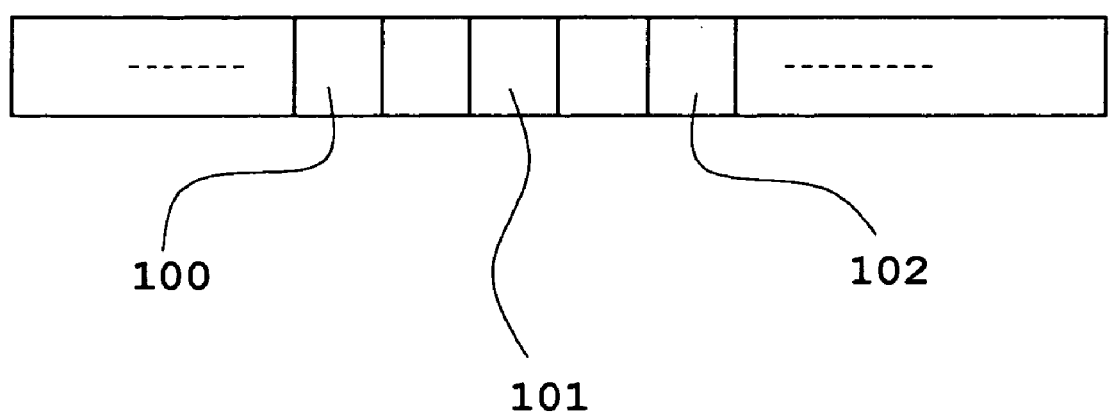
FIG. 2 shows EIT information included in a digital broadcast signal.

According to the specified standard, the EIT information may include various descriptors, as shown in FIG. 2. The descriptors may include, for example, a short format event descriptor 100 indicating a program title, a content descriptor 101 indicating a program genre, and an extended format event descriptor 102 indicating information explaining a program (topic information). Plural types of topic information are designated in an extended format event descriptor 102. For example, in a music broadcast, plural topics such as song title, singer, songwriter, and composer are designated. In the present embodiment, this descriptor information is effectively used as described below. The arrangement of each descriptor is arbitrary.

Figure 3:
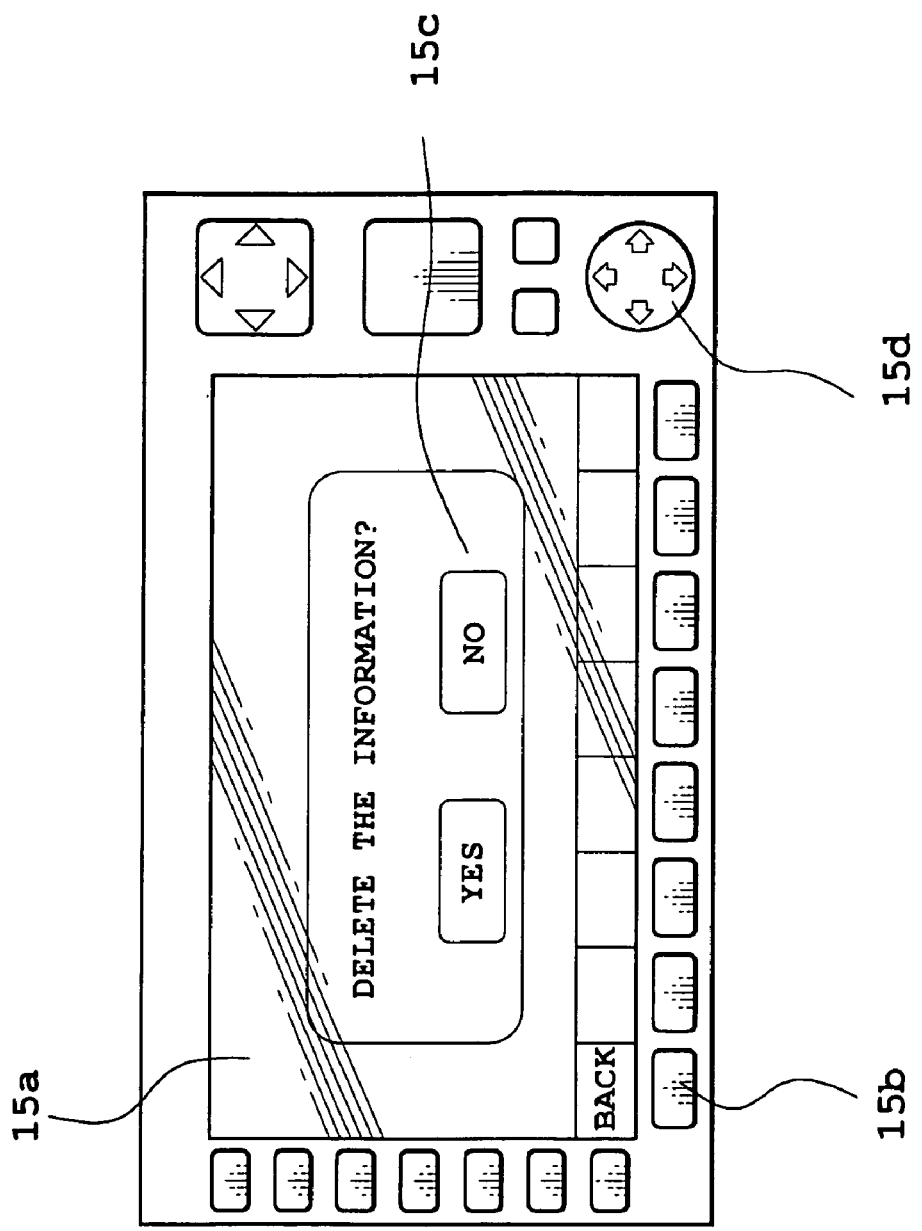
FIG. 3 shows a display device of the receiving device of FIG. 1.

FIG. 3 is a front view of the display device 15 of the receiving device. Contents are indicated in the central display screen (display area) 15a. For example, an image of a television broadcast is displayed, or multiplex data of a mood image or the like of a music broadcast may be indicated. And various information which can be obtained from EIT are indicated on the display screen 15a. Concerning screen indication during vehicle traveling, it is preferable to impose a display restriction according to the display content.

Input devices 17 for manipulation by the user are arranged around the display screen 15a. For example, a plurality of function switches (FSW) 15b are arranged under the display screen. Each switch 15b is provided with a function displayed above the switch, and the function of a switch 15b can appropriately be changed. Within the display screen, a number of in-screen switches 15c may be displayed. The user can operate a cursor switch 15d disposed on the right of the function switches 15b to select a desired in-screen switch 15c. The cursor switch 15d is operable in eight directions. Selection is finalized by a push on the cursor switch 15d. Another cursor switch on the upper right may, for example, be used for scrolling up/down channels. It is preferable that the in-screen switches 15c are grayed out while the vehicle is in motion to restrict selection. Furthermore, to ensure safety during vehicle traveling, it is preferable that manipulation of the cursor switch 15d be invalidated when the vehicle is in motion.

It should be noted that the display device 15 of FIG. 3 may be configured as a device which can also be used as a navigation apparatus and for other vehicle-mounted manipulation devices.

Figure 4:
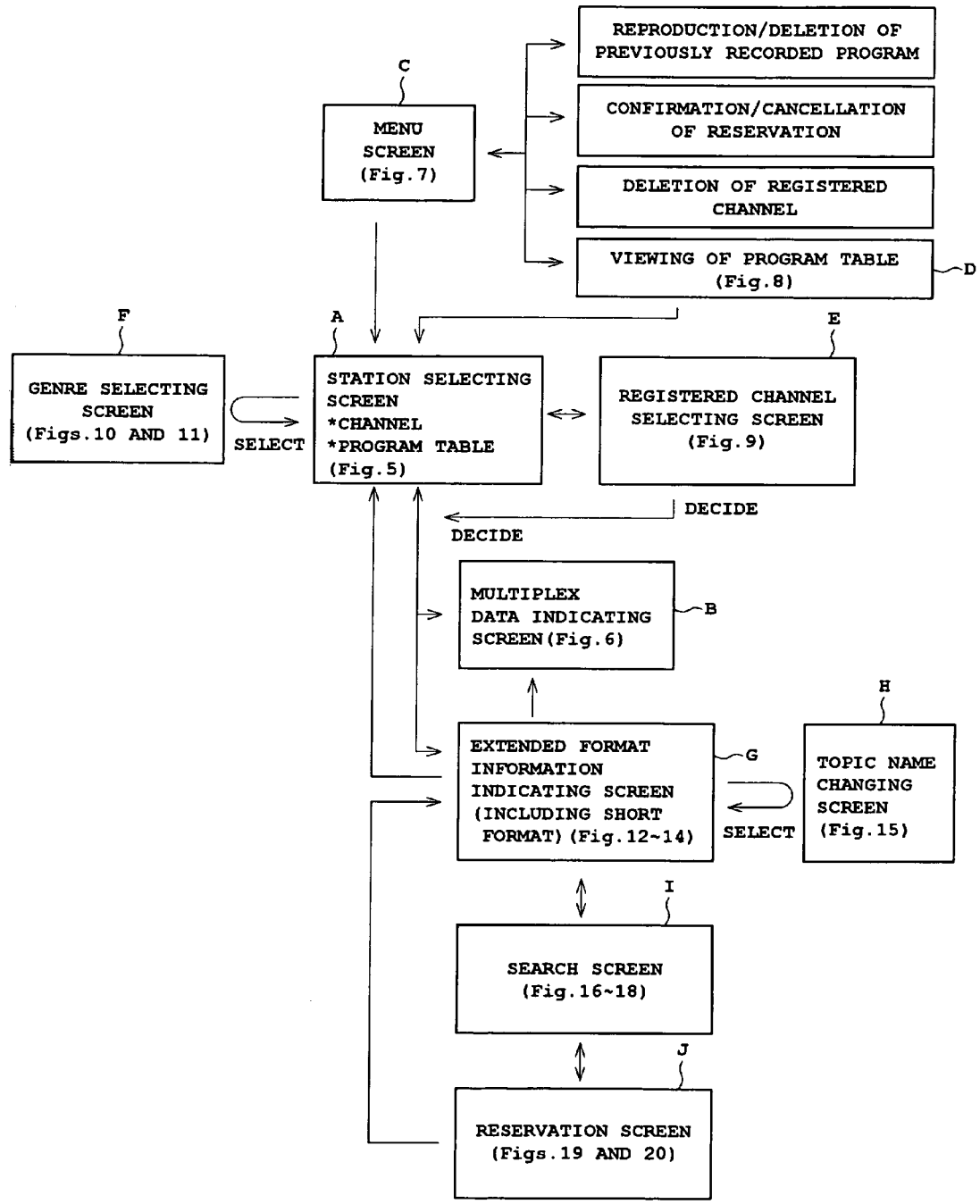
FIG. 4 illustrates the transfer of various screen images indicated on the display of FIG. 3.

FIG. 4 is a diagram showing the transfer of the basic screen images indicated on the display device 15. Specific examples of screen images are shown in FIGS. 5–20. The following description refers to a music broadcast as an example.

Figure 5:
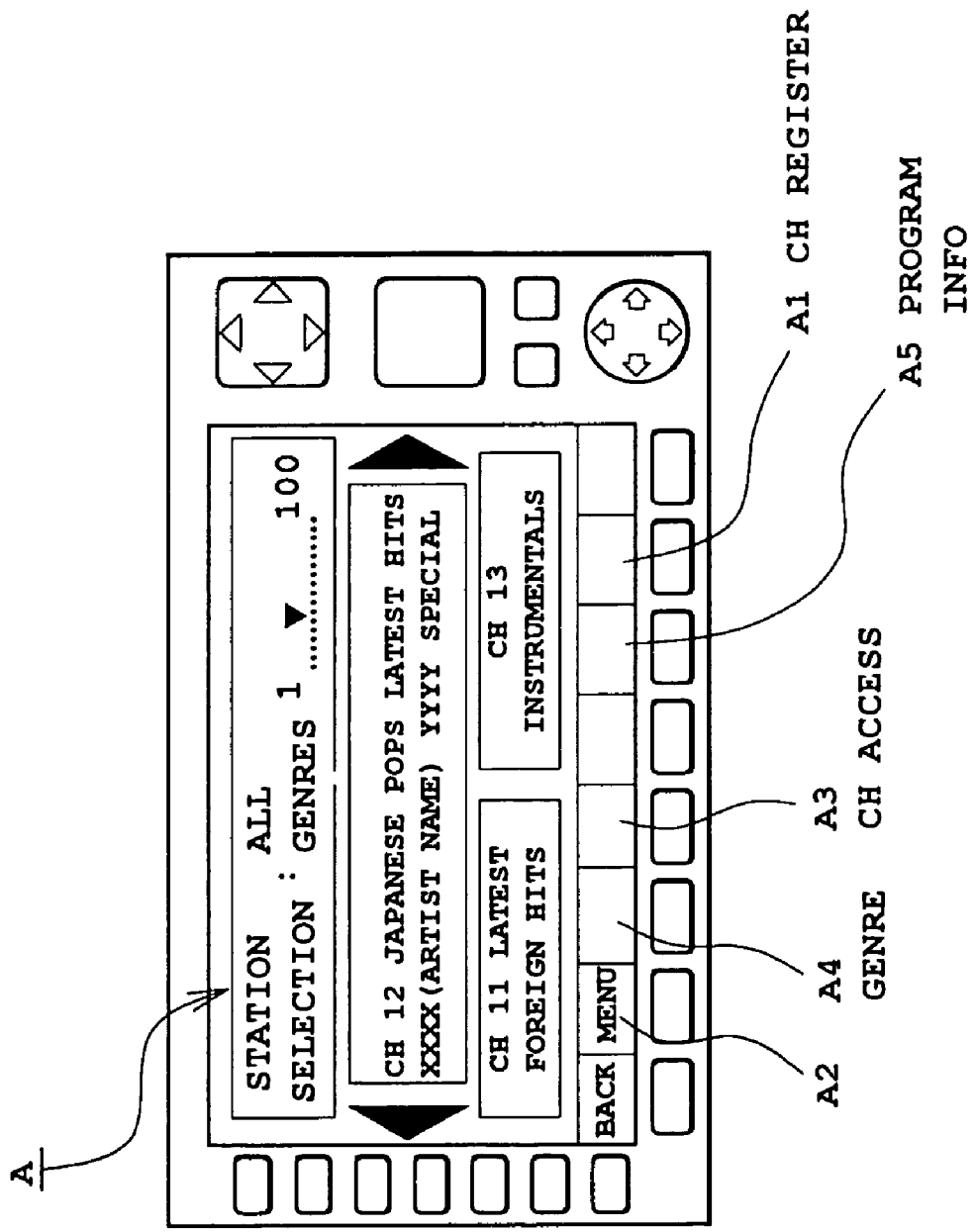
FIG. 5 illustrates the station selection screen shown in FIG. 4.
Figure 6:
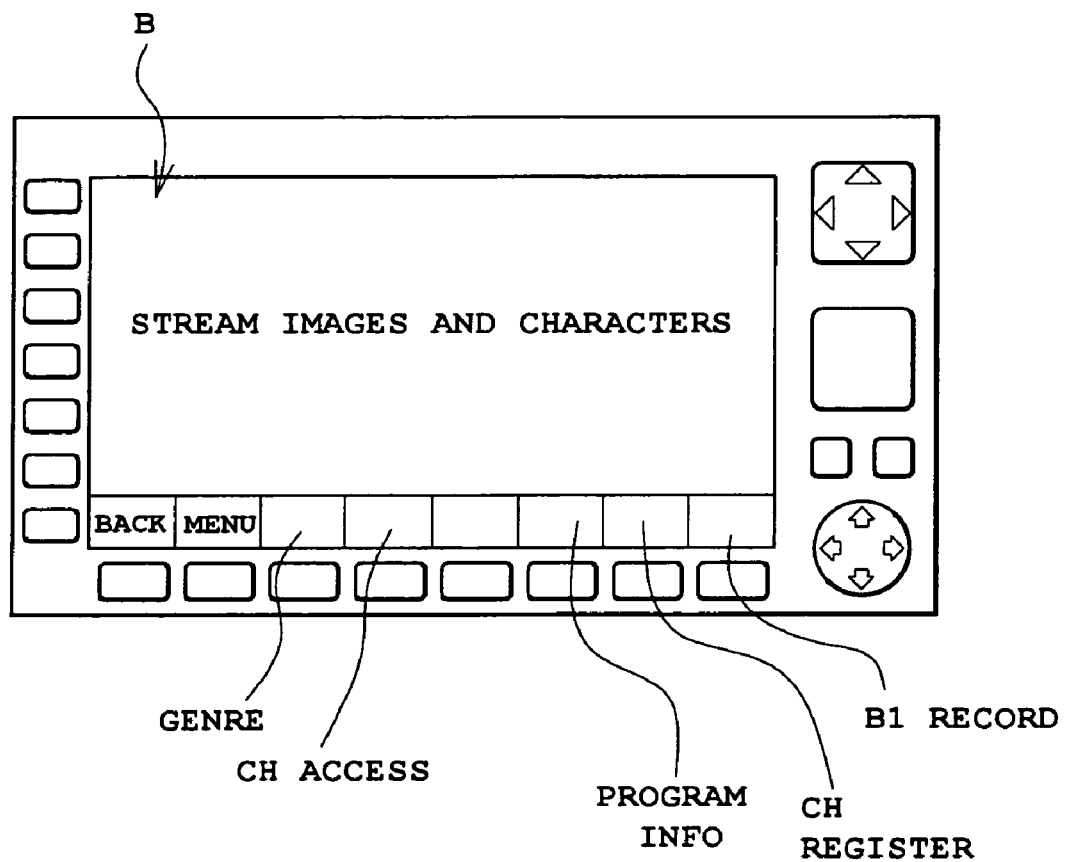
FIG. 6 illustrates the multiplex data indicating screen shown in FIG. 4.
Figure 7:
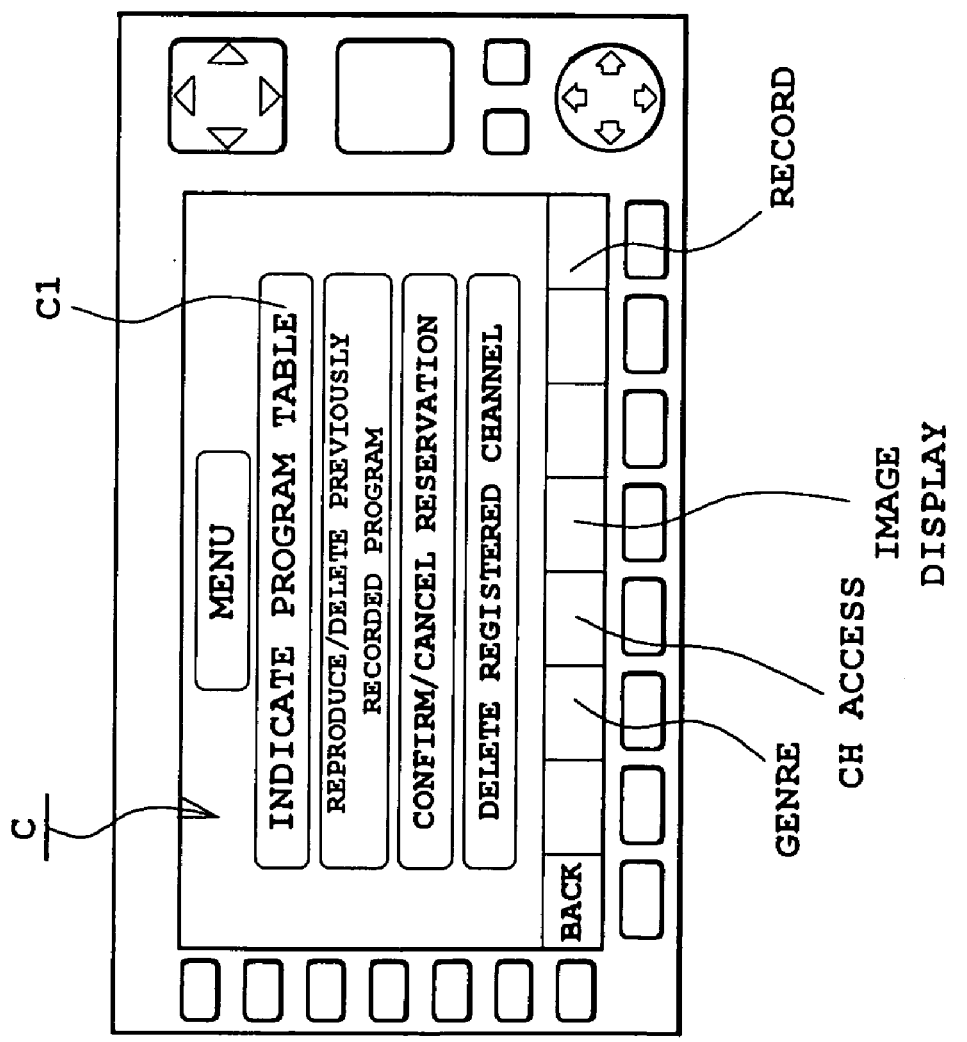
FIG. 7 illustrates the menu screen shown in FIG. 4.
Figure 8:
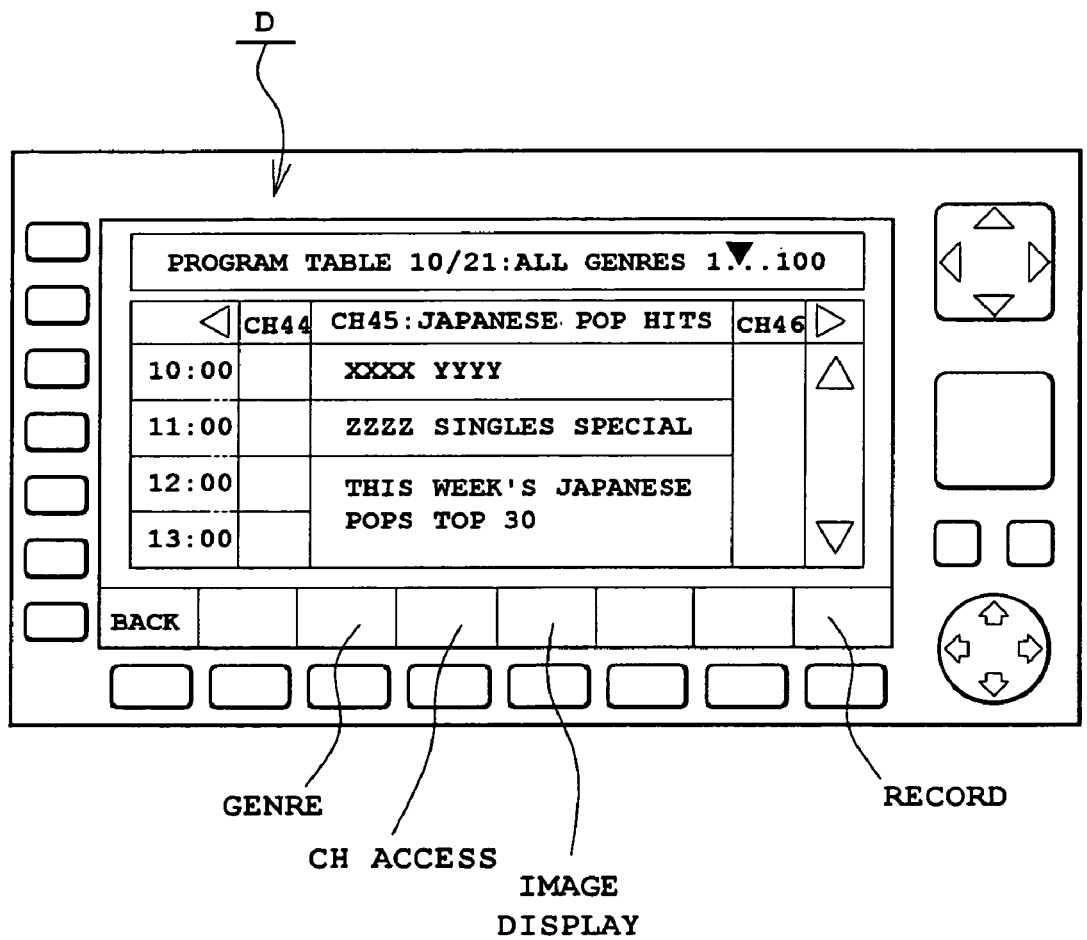
FIG. 8 illustrates the program table viewing screen shown in FIG. 4.
Figure 9:
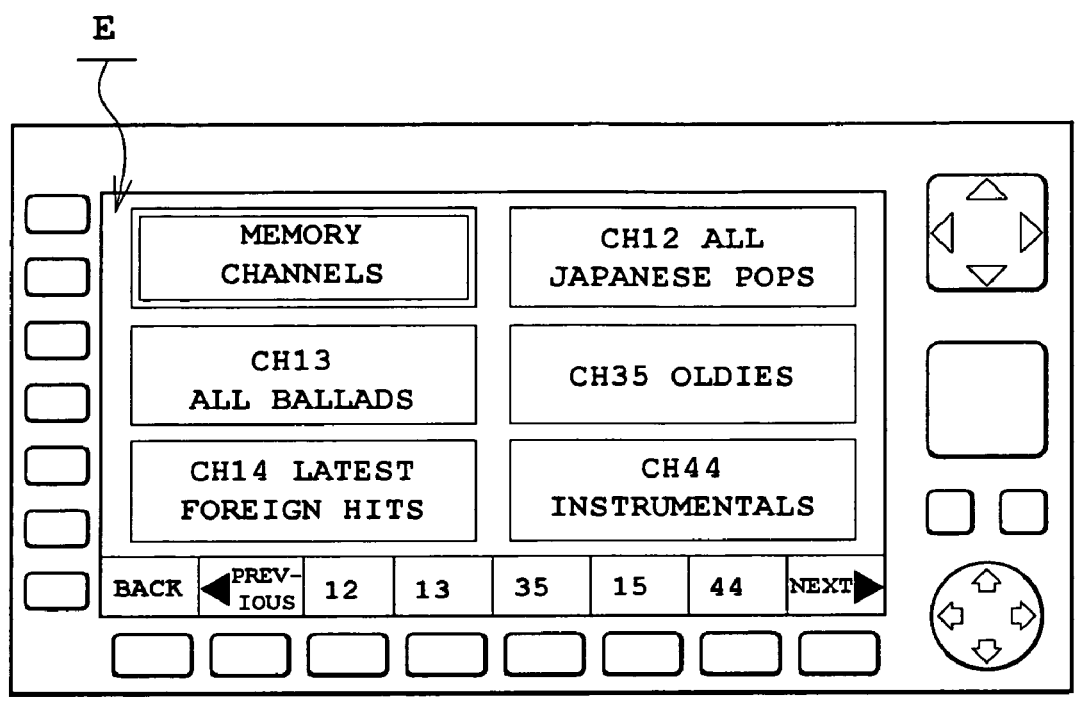
FIG. 9 illustrates the registered channel selection screen shown in FIG. 4.

In FIG. 4, the station selecting screen image A (illustrated in FIG. 5) is used to select a receiving channel. In the upper portion of the station selecting screen image A, the objects of selection, which may be stations of all genres, are shown in an indicator format such as 1–100. In the center portion of the image, the selected (presently receiving) channel and the STD channel composition name are displayed. When the EIT short format information is acquired, the present program title can be displayed. In the lower portion, channel information regarding the channels immediately prior to and after the presently selected channel may be displayed. In FIG. 5, the channel register switch A1 is used to store a desired channel. After selecting a station, stream images and characters of the selected channel are displayed on the multiplex data indicating screen image B (FIG. 6). In FIG. 6, the sound/image recording switch B1 is indicated according to the content of a digital copy descriptor. By pressing the sound/image recording switch B1 while it is indicated, the presently broadcast program is recorded.

Figure 10:
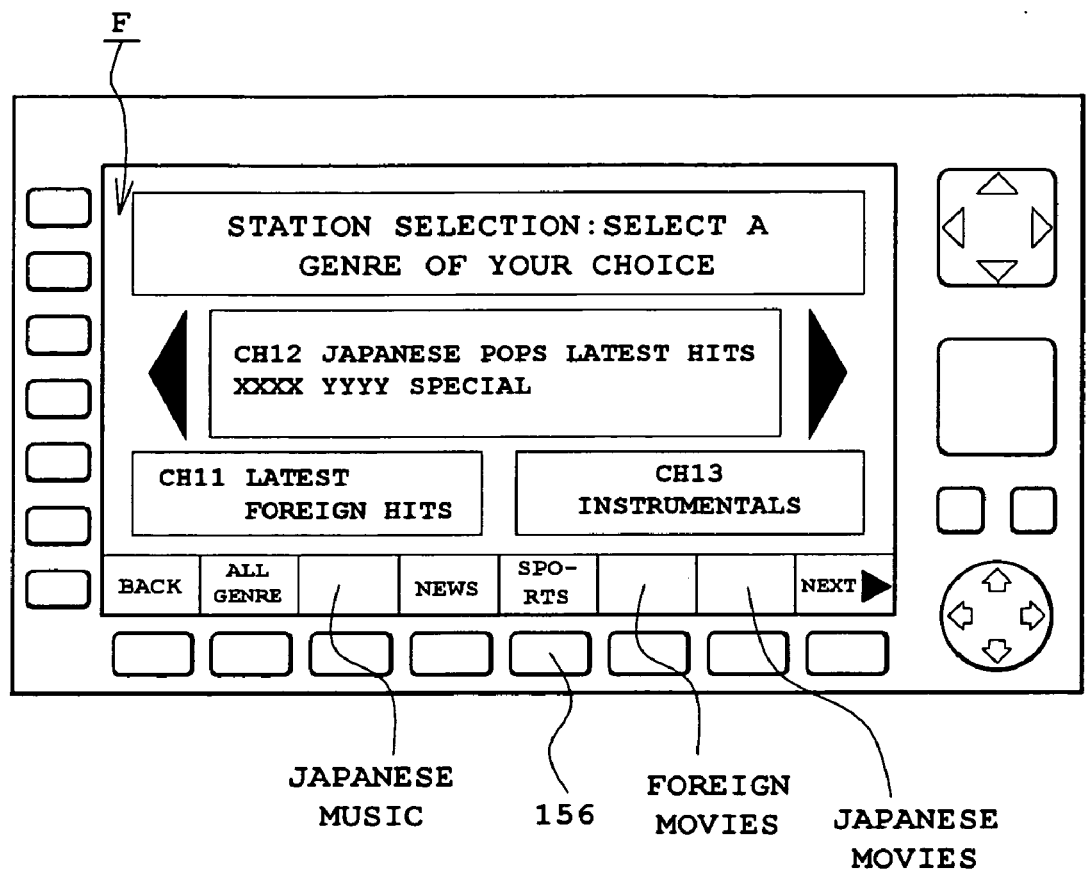
FIG. 10 illustrates the genre selection screen shown in FIG. 4.
Figure 11:
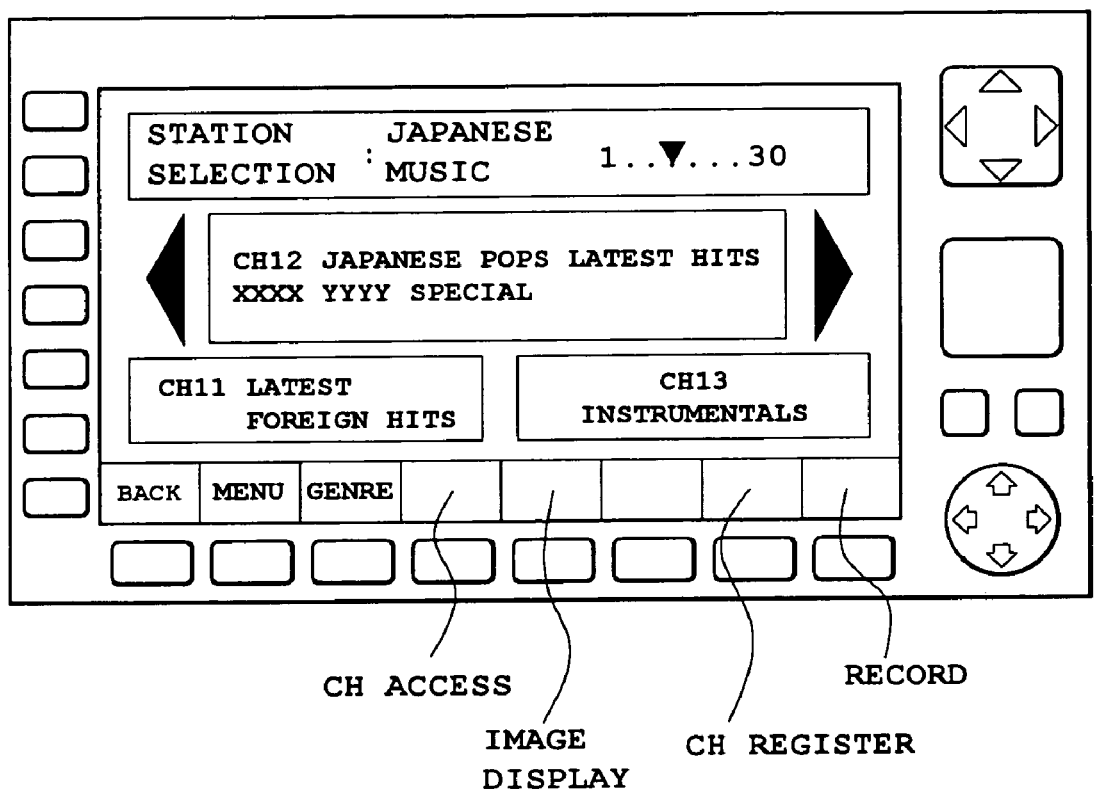
FIG. 11 illustrates the genre selection screen shown in FIG. 4.

When the menu switch A2 is operated in the station selecting screen image A, the menu screen image C (FIG. 7) is displayed. When "indicate program table" C1 is selected while in the menu screen image C, the program table viewing screen image D (FIG. 8) is displayed. Further, when the channel access switch A3 is selected while in the station selecting screen image A, the registered channel selecting screen image E (FIG. 9) is displayed, which includes the registered channel numbers indicated in the lower portion of the image. When the genre switch A4 is operated, the genre selecting screen image F (FIG. 10) is displayed. When a particular genre is selected while in the genre selecting screen image F, programs belonging to the particular genre are extracted and indicated (FIG. 11).

Figure 12:
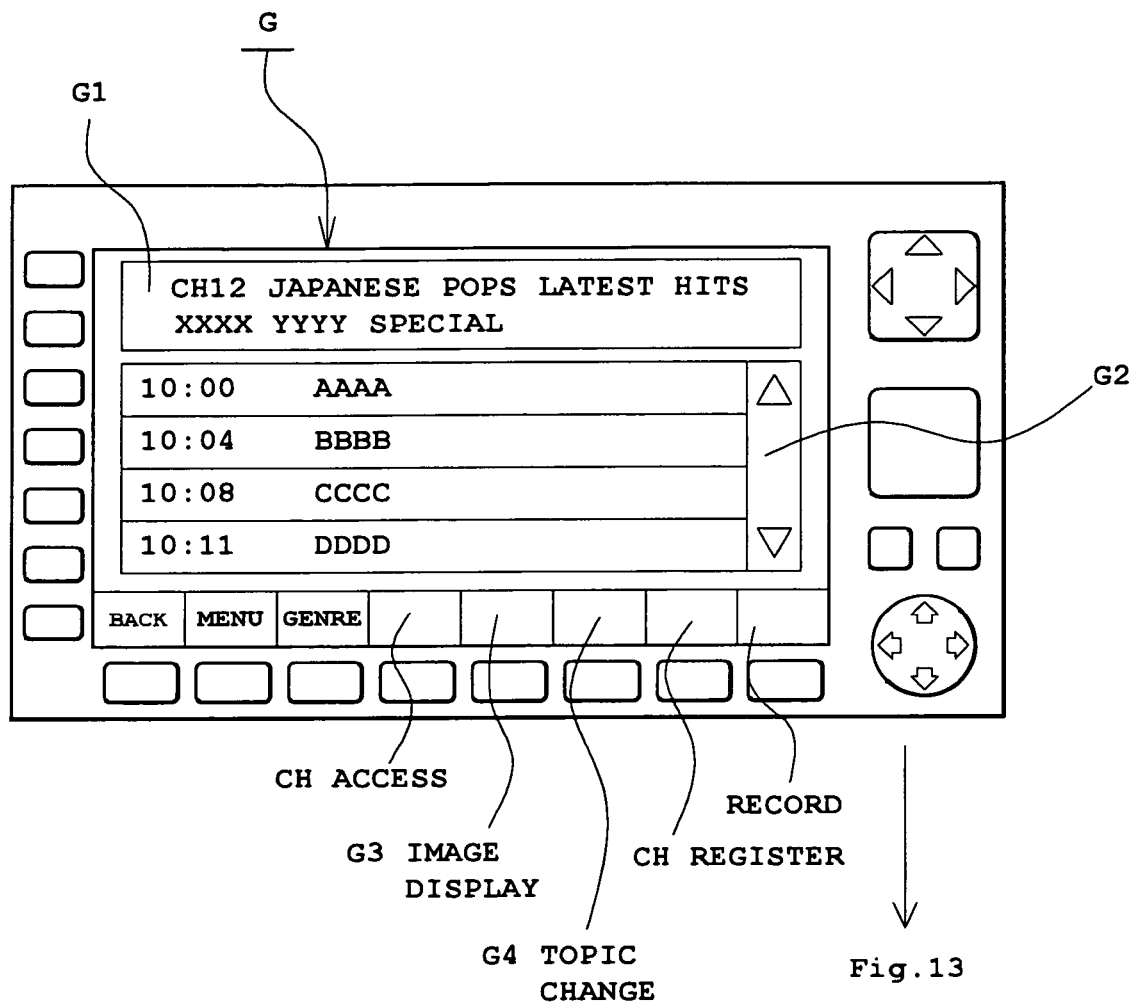
FIG. 12 illustrates the extended format information indicating screen shown in FIG. 4.
Figure 13:
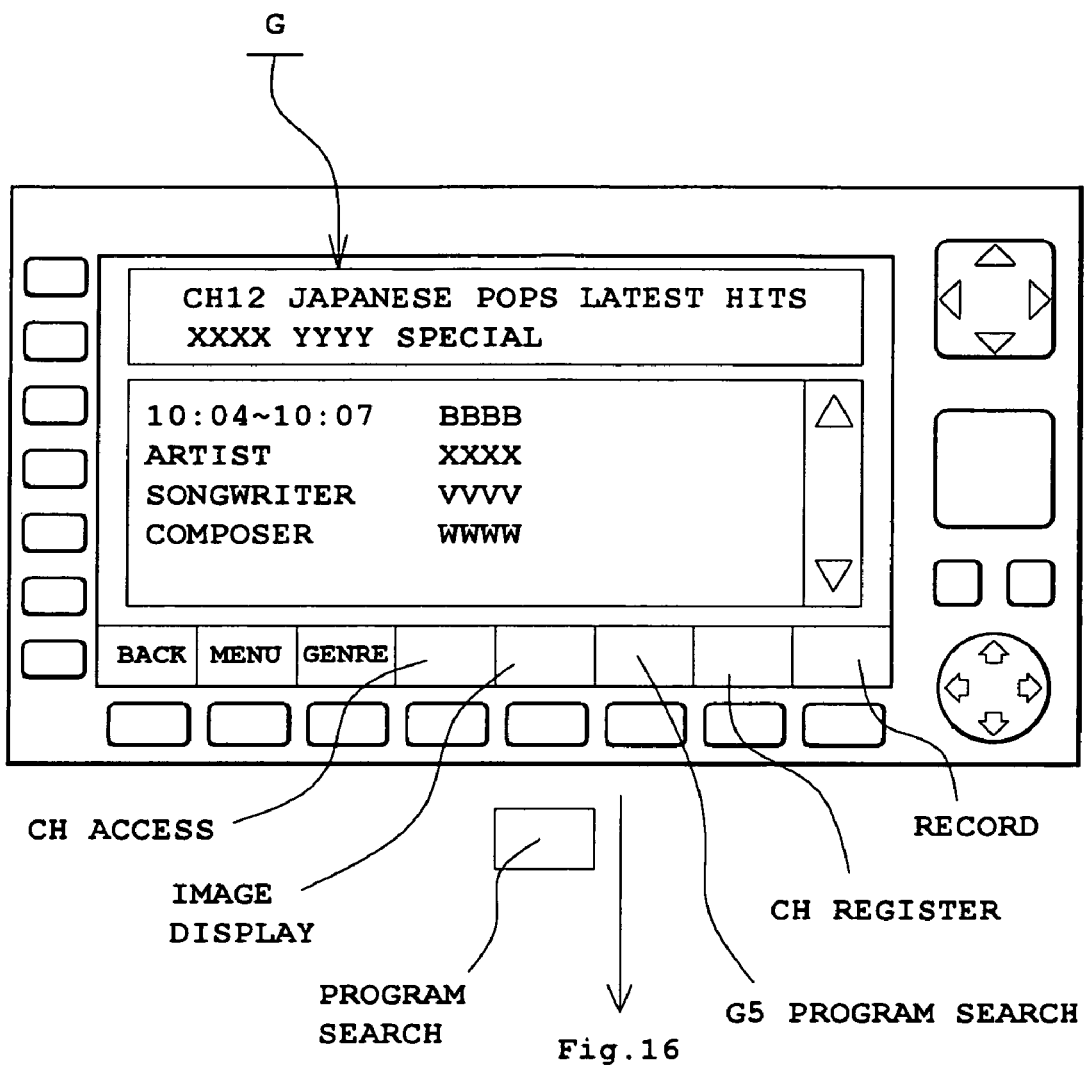
FIG. 13 illustrates the extended format information indicating screen shown in FIG. 4.
Figure 14:
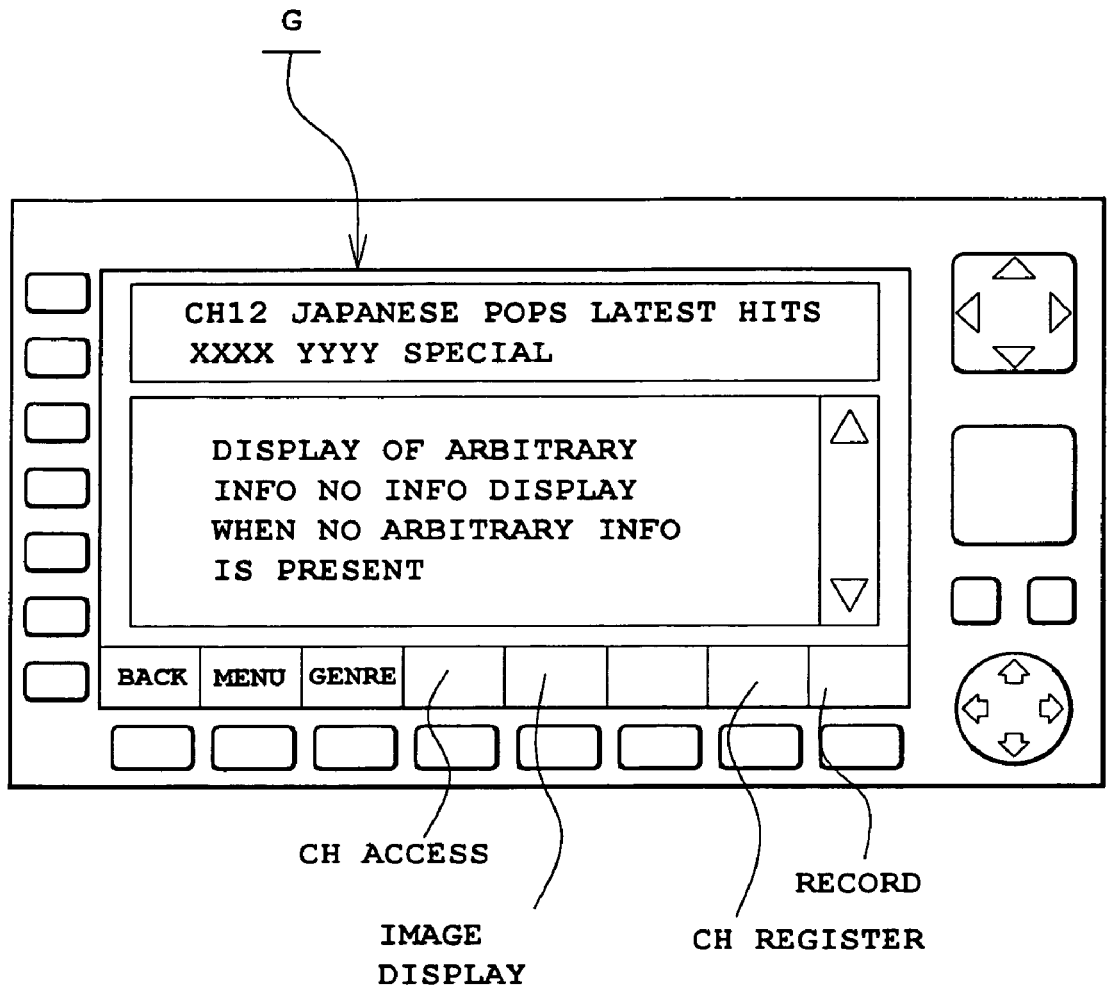
FIG. 14 illustrates the extended format information indicating screen shown in FIG. 4.

When the program information switch A5 is operated in the station selecting screen image A, the display image changes to the extended format information indicating screen image G (FIGS. 12, 13, and 14). In this screen image G, a program name G1 obtained from the EIT short format event descriptor 100 is indicated. In addition, topic information obtained from the extended format event descriptor 102 is also displayed. In FIG. 12, information related to one type of topic is arranged and displayed (in this example, titles of the songs to be broadcast in the selected program are listed). When one song title (BBBB) within the list is selected, plural types of topic information (song title, singer's name, etc.) concerning the selected object are displayed, as shown in FIG. 13. At this point, basically all topics are displayed, and when there are many display items, it is preferable to use a scroll bar G2 to sequentially switch the display items. Further, topics concerning the presently executed event and the events executed in the past may preferably be visually distinguished (by changing the color of indication, for example). In FIG. 12, the image display switch G3 is indicated only when multiplex information is available.

When the topic change switch G4 of FIG. 12 is operated, the topic changing screen image H (FIG. 15) is indicated. This screen image is used to change the topic information to be displayed.

When the program search switch G5 in the screen of FIG. 13 is operated, the search screen image I (FIGS. 16–18) is indicated. A search keyword is designated in the program search screen image of FIG. 16 (the image desirably indicates all topics as keywords; scroll indication may be used when many display items exist). The search results are indicated in the search result screen image shown in FIGS. 17 and 18. By highlighting the indication of the items found as a result of the search, user recognition can be facilitated.

Figure 18:
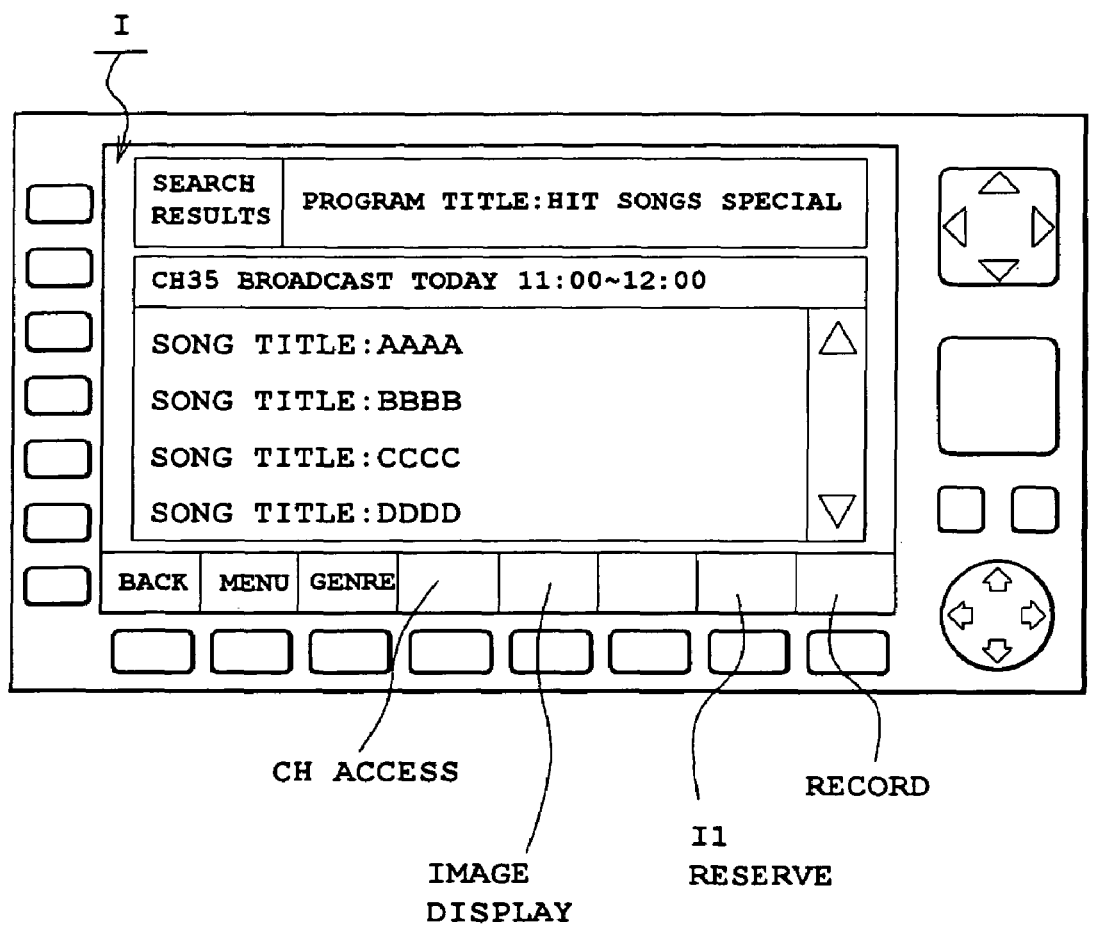
FIG. 18 illustrates the search screen shown in FIG. 4.
Figure 19:
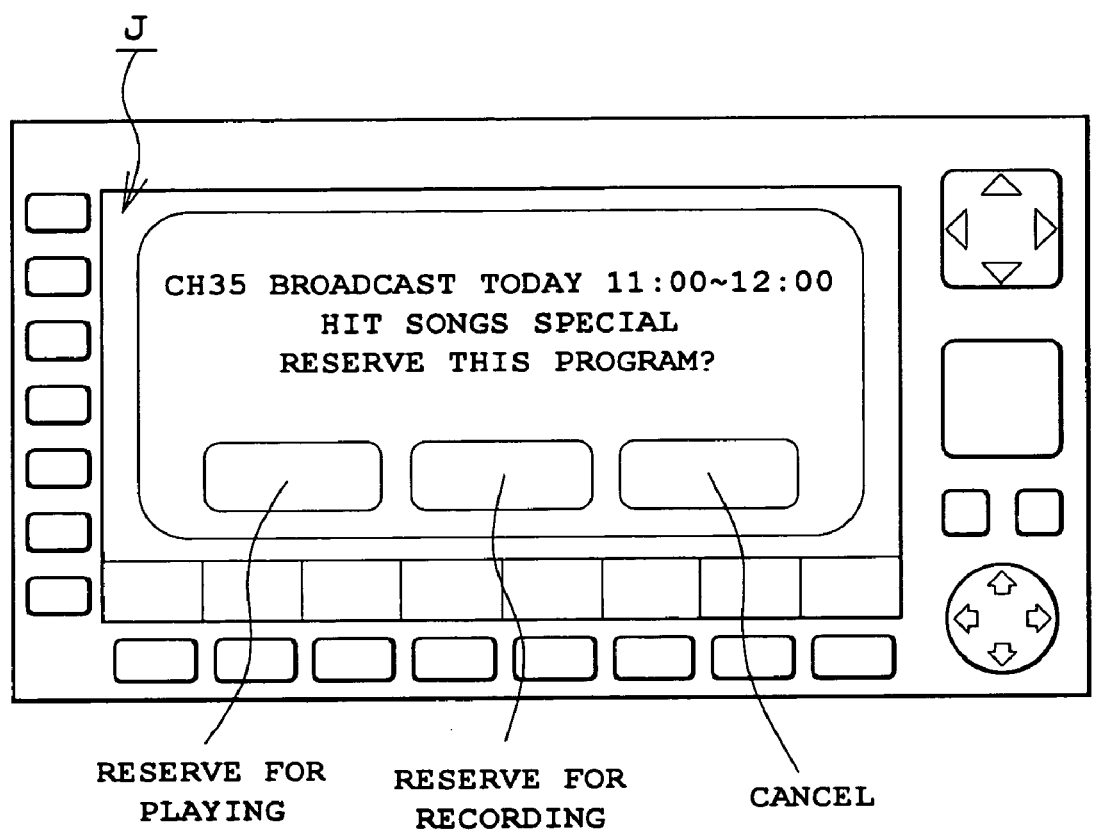
FIG. 19 illustrates the reservation screen shown in FIG. 4.
Figure 20:
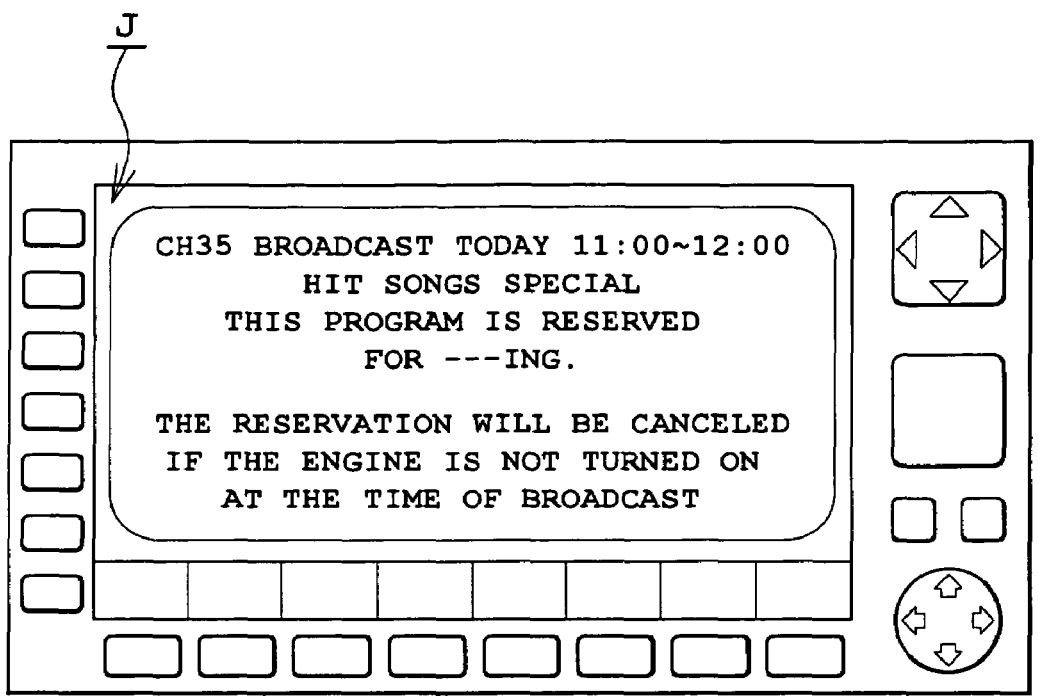
FIG. 20 illustrates the reservation screen shown in FIG. 4.

When the reservation switch 11 is pressed in the screen image of FIG. 18, the reservation screen image J is displayed (FIGS. 19 and 20). In the screen image of FIG. 19, playing or recording of the searched program can be reserved. A message notifying completion of the reservation is indicated as shown in FIG. 20.

[Display of Extended Format Information]

Processing for displaying extended format information, which is one feature of the present embodiment, is next described.

Plural types of topic information for explaining a program content can be designated in the extended format event descriptor 102. To describe program content in detail, it is preferable to designate more topics. However, when information for many topics is indicated within a limited display area of, for example, a vehicle-mounted monitor, the display image becomes complicated and may not offer a quick overall view of programs.

In light of this limitation, it is preferable to restrict the topic information to be displayed. However, if arbitrarily restricted, topics important to the user may be removed from the screen in order to display unnecessary topics. The issue of how to display appropriate topics is therefore very significant.

Furthermore, it is an advantage of a digital broadcast that a variety of channels can be set to receive programs of many genres. Accordingly, it is desirable to configure an arrangement for providing the users with information on appropriate topics for any genre.

The present invention accomplishes appropriate restriction of displayed topics. Specifically, the present invention makes use of the point that "a value for a user, such as importance and usefulness, of displaying an information differs among topics, and ranking of display values of plural topics differs depending on the genre of the program content".

Considering this point, in the present embodiment, display priority degrees for topic information are designated separately for each genre according to display values, and the topics are displayed according to the priority degrees. Specifically, as shown in FIG. 21, a display priority ranking table defining display priority ranking (one form of display priority degrees) for plural topic information items is stored for every genre. This table is stored in a display priority ranking table storing unit 21 in the memory device 9 within the broadcast receiving device 1 of FIG. 1.

Referring to FIG. 21, for the genre of music, priority ranking is designated in the order of song title, artist, songwriter, composer, and arranger, according to the values for this user. In this embodiment, a topic concerning persons appearing in a program (cast, newscaster, or weathercaster) is designated as an extended format event descriptor 102 in a plurality of genres, but the ranking for this topic differs in each genre. This is because the value of the information concerning persons appearing in a program differs depending on the genre. The number of displayed topics is determined according to the actual broadcast conditions.

The display priority ranking table of FIG. 21 is used as follows by the control processor 7 (the processing means of the present invention) in the broadcast receiving device 1 of FIG. 1. The processing performed by the control processor 7 is described below referring to the system diagram of FIG. 1 and the flowchart of FIG. 22.

Figure 22:
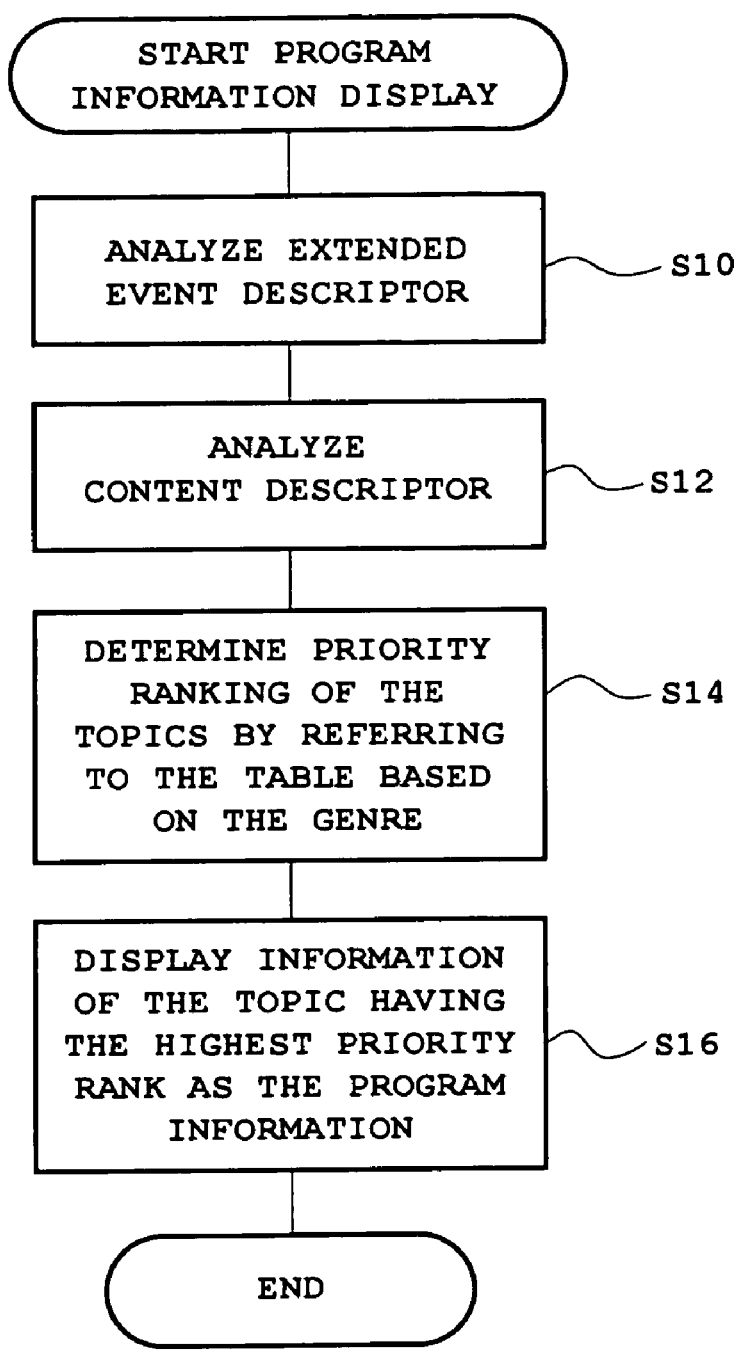
FIG. 22 is a flowchart showing an operation of the receiving device related to display priority ranking.

In the present embodiment, the processing of FIG. 22 starts when, for example, the "program information switch A5" (FIG. 5) is operated. After the control processor 7 acquires EIT information from the data demodulator 5, the EIT analyzer 31 analyzes the extended format event descriptor 102 in the EIT to obtain plural types of topic information (S10). In addition, the content descriptor 101 in the EIT is analyzed to obtain the program genre (S12). In S10 and S12, the topic information and genre may be obtained for the program presently received for listening and/or watching.

The output information generator 33 of the control processor 7 refers to the display priority ranking table stored in the memory device 9, and reads out the priority ranking of the obtained genre for each topic information (S14). Based on this priority ranking, output information is generated so as to display the data for the topic having the highest priority rank as the program information (S16). This output information is indicated on the display 15 via the decoder 11.

The result of the above processing is shown in the extended format information indicating screen image G of FIG. 12. In the example of FIG. 12, a music broadcast is being received. "Music" is detected from the content descriptor 101 as the genre. In the table of FIG. 21, the topic having the highest priority rank in the genre of "music" is "song title", which has the highest value for the user.

Accordingly, as shown in FIG. 12, only the song titles are listed. Singers, songwriters, and composers are not indicated. By displaying upon restricting the information to only those that are highly valuable, the display image is easy to see.

In the above-described present embodiment, the topic for display is restricted based on the priority ranking. This is one form of topic indication according to priority ranking. Other forms of indication are possible within the scope of the present invention.

For example, FIG. 13 shows another form of topic indication according to priority ranking. The screen image of FIG. 13 is displayed when one song is selected in the screen image of FIG. 12. In this example, song "BBBB" is selected. In FIG. 13, all topic information related to the selected song BBBB are indicated, with the order of indication matching the ranking in the priority ranking table. In FIG. 13, the displayed information may be restricted to information within a predetermined rank from the top (for example, only the song title and the artist).

Figure 15:
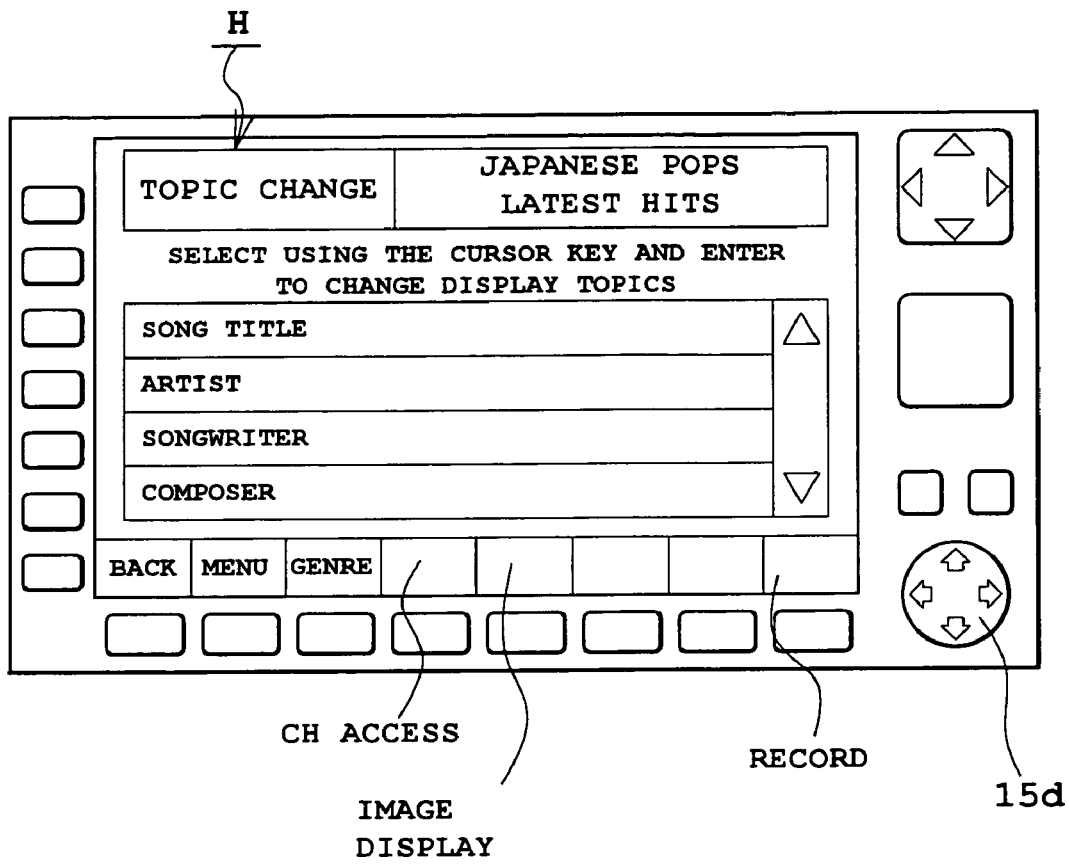
FIG. 15 illustrates the topic name switching screen shown in FIG. 4.

A further topic indication based on priority ranking according to the present invention is executed in a preferable manner in the topic changing screen image H of FIG. 15. The screen image of FIG. 15 is indicated when the "topic change switch G4" is operated while in the program information screen image (extended format information indicating screen image G) of FIG. 12. In FIG. 12, only the topic "song title", which is at the highest rank according to the display priority ranking, is displayed. When other types of topic information are desired, the user presses the "topic change switch G4" to indicate the screen image of FIG. 15. In the topic changing screen image H of FIG. 15, topic names are listed in order from the highest priority rank. The user operates the cursor switch 15d to select a desired topic. The screen image of FIG. 12 is then displayed again, and the information concerning the selected topic are listed. For example, when "composer" is selected, composers are indicated for all songs.

Similarly in the topic changing screen image H, topics are arranged within a change list in order from the topic most valuable for the user, such that topics which are selected at a higher frequency are arranged near the top of the list. As a result, the amount of manipulation (the number of manipulations of the cursor switch 15d) required for making a desired change is reduced. In this way, the present invention not only achieves clearer screen indication, but also facilitates manipulation.

Figure 16:
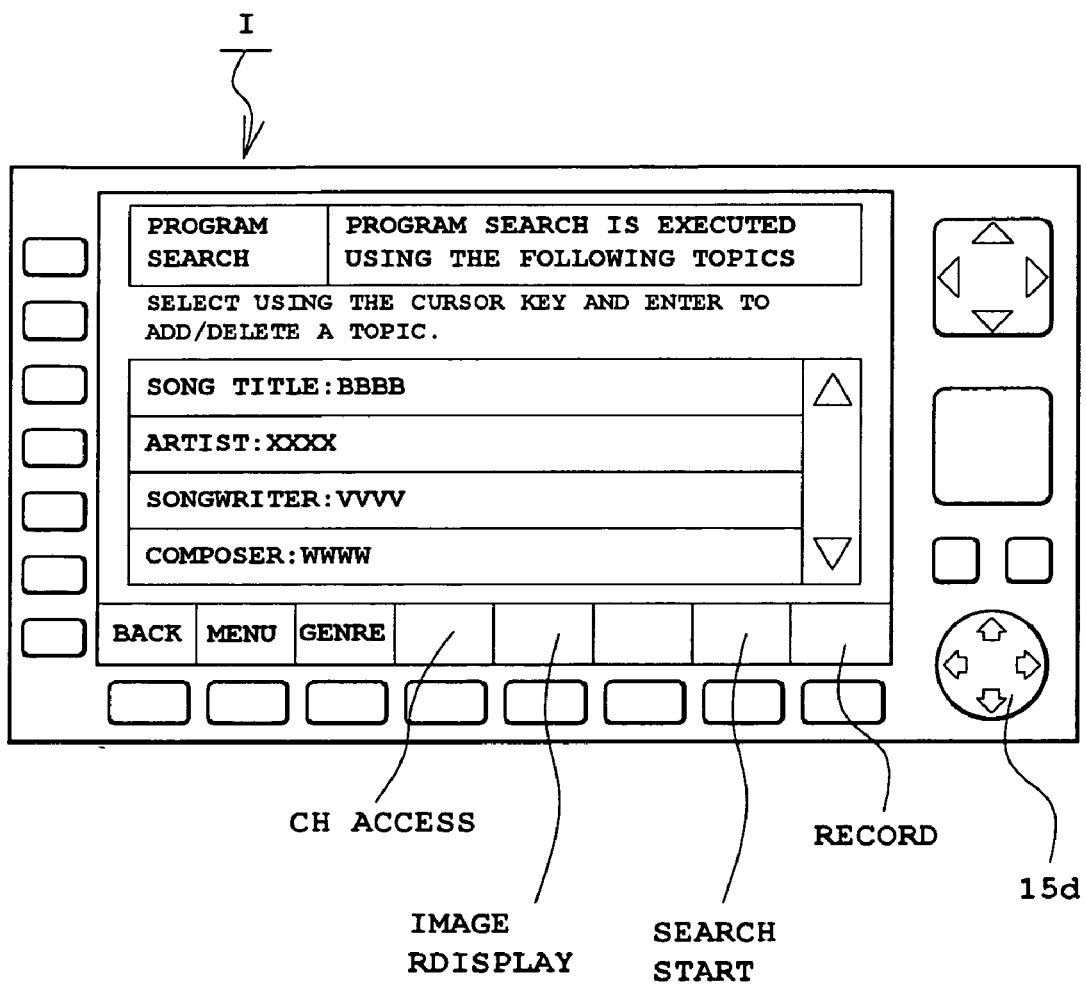
FIG. 16 illustrates the search screen shown in FIG. 4.
Figure 17:
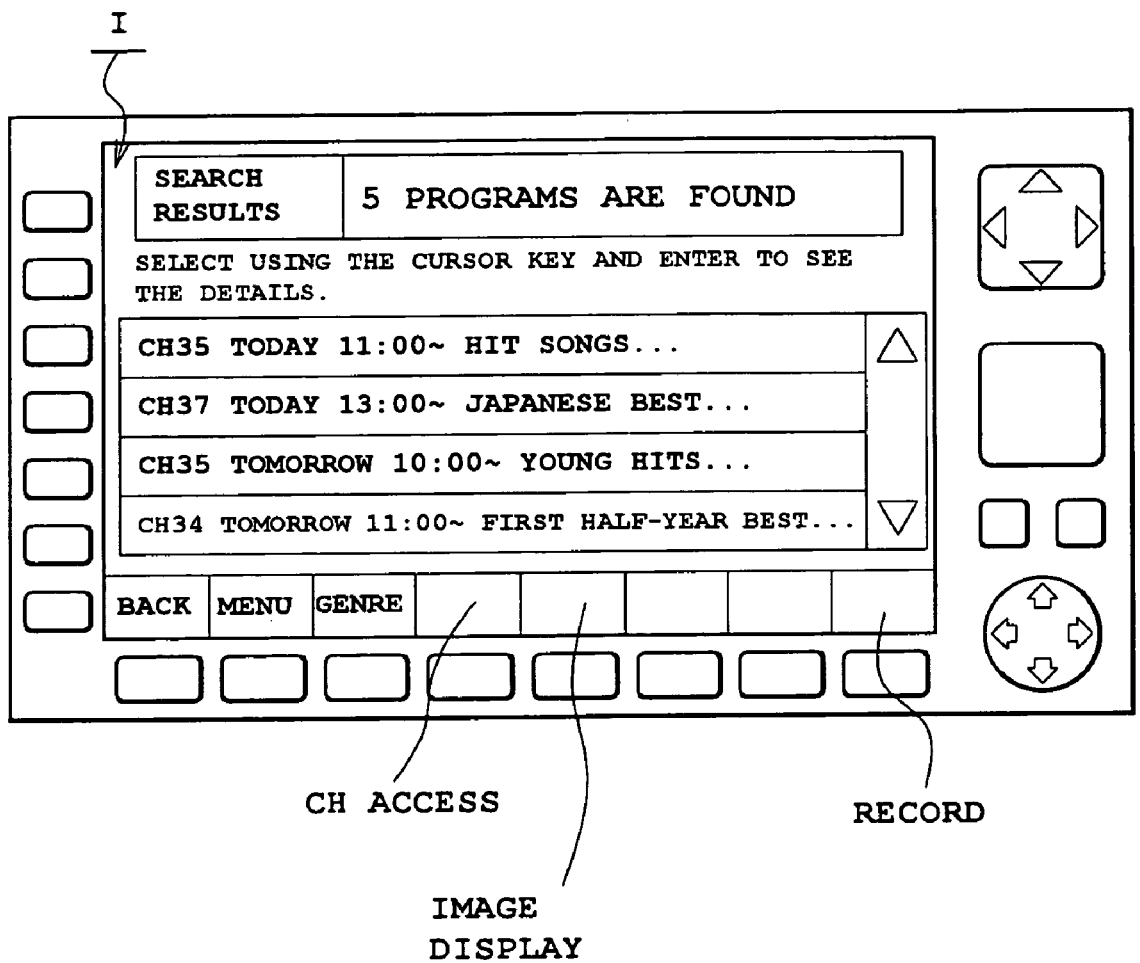
FIG. 17 illustrates the search screen shown in FIG. 4.

Priority ranking is effectively used also in the search processing screen image I of FIGS. 16–18. This point will be explained later.

Other than the above-described examples, various forms of indication according to priority ranking can be conceived as further modifications of the present embodiment. For example, color coding, change in font size, change in brightness, and other indications may be implemented according to priority ranking.

[Change of Display Priority Ranking]

In the above-described topic changing screen image H (FIG. 15), the user selects a topic type which he/she desires. By using such a selection manipulation, it is preferable to change the priority ranking of the display priority ranking table (FIG. 21). Specifically, the display priority ranking is changed such that a topic which is selected a more number of times is ranked higher.

For example, a selection frequency storing unit (not shown) for storing a selection frequency for each topic in each genre is provided in a predetermined area within the memory device of FIG. 1. Each time the user selects a change to a particular topic, the control processor increments (+1) the selection frequency of the particular topic. When no topic change is performed, the selection frequency of the topic currently at the highest priority rank may be incremented (+1). The selection frequency is recorded in the predetermined area within the memory device 9. The topic having the highest selection frequency is assigned with the highest priority rank. Priority ranks are then assigned to each of the remaining topics in the order of the selection frequencies. When the selection frequencies of two topics change places within the order, the corresponding ranks within the table also change places. For example, in the example of FIG. 15, the ranking of "artist" becomes the highest when the selection frequency of "artist" exceeds that of "song title".

This aspect is favorable in the following regards. Individual users have different opinions regarding a value of a topic information, depending on their interests and tastes. Song titles may be important for a particular user, while artists may be important for others. A user of a receiver selects information highly valuable for him/herself at a high frequency. By changing the display priority ranking according to selection frequencies as in the present embodiment, the receiving device can appropriately deal with differences in value standards among individual users. Accordingly, each user can be supplied with information useful to him/herself by precedence, resulting in a further convenient receiving device.

[Estimation of Genre]

A feature of the present embodiment is that priority among topics is determined separately for each genre. Genre is obtained from an EIT information, which is a form of supplementary information of the present invention. However, there may be cases when genre information is not included in the EIT information. More specifically, the content descriptor 101 reciting the genre may not be designated. Even in such a case, favorable indication is achieved by the following processing.

In the present embodiment, when genre information cannot be obtained, genre is estimated from the topic information explaining the program. The estimation processing is executed by the control processor 7 by referring to the priority ranking table in the memory device 9. The control processor 7 acquires plural types of topic information as the extended format event descriptor 102 of a particular program. The control processor 7 then determines the degree of match between those topics and the lists of topics within the table. The genre having the list of topics with the highest degree of match is estimated as the genre of the target program.

The degree of match refers to the degree to which the topics within the EIT and the topics within the table are identical. For example, a list of topics for one genre within the table and the plural topics within the EIT information are obtained. Subsequently, the number of topics included in the EIT information but not included in the table is determined. When this number of topics is small, the degree of match is determined to be high. When a list of topics for a particular genre includes all the topics within the EIT information, the degree of match for the particular genre is determined as highest. Referring to FIG. 21, when title, cast, and director are acquired as topic information, the genre of the target program is estimated to be "movie". When song title and artist name are acquired, the genre of the target program is estimated to be "music".

Figure 23:
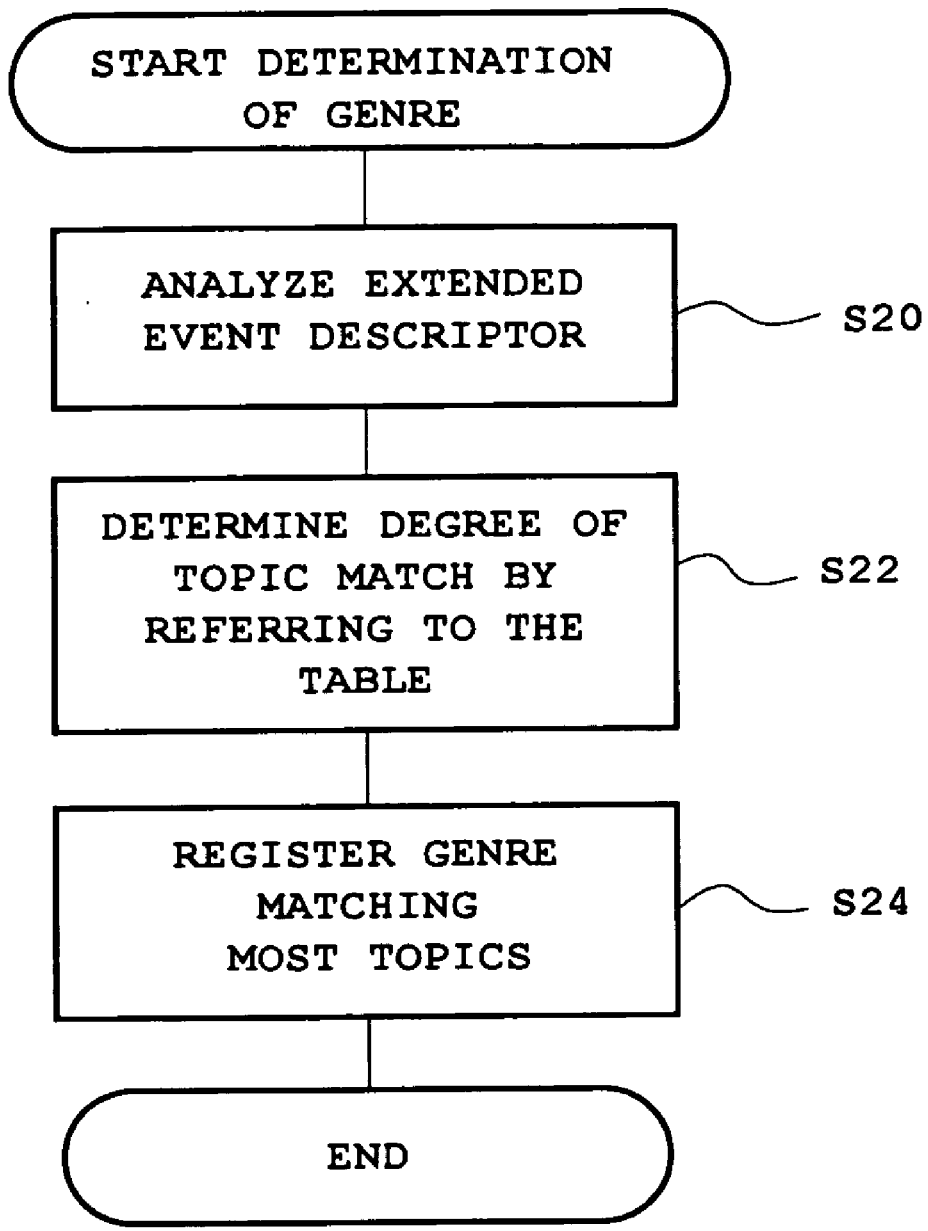
FIG. 23 is a flowchart showing a genre determining processing.

FIG. 23 is a flowchart illustrating the above processing. An extended format event descriptor 102 is analyzed (S20), and the degree of topic match is determined referring to the table (S22). The genre having the most number of topic match is registered as the estimated genre (S24). The estimated genre is retained in a memory within the control processor 7 or in the memory device 9.

In the present embodiment, the topics are indicated according to the display priority ranking, as described above, based on the estimated genre. Forms of indication are as previously described, and the extended format information may be displayed as shown in FIGS. 12–15.

A result of genre estimation can further be effectively used in the genre selecting screen F. In this example, the control processor 7 obtains the genres for all programs within the EIT. When the content descriptor 101 is present, information of the descriptor 101 is used. For programs without content descriptors 101, genres are estimated. Based on the genre information acquired in this way, the genre selecting screen images F of FIGS. 10 and 11 are displayed. In FIG. 10, genre names are assigned to the function switches 15*b*. When a switch for a particular genre is operated, programs in the particular genre are extracted and displayed (FIG. 11). In the example of FIG. 11, a list of music programs is indicated. Music programs provided with no genre information can also be indicated in the screen image of FIG. 11 based on the estimation results.

In addition to the above, a result of genre estimation can also be employed favorably in any screen image indicating a genre or using genre information.

In the present embodiment as described above, by using the correlation between a genre and topic information, appropriate indication can be accomplished even when a genre of a program is unidentified from a supplementary information such as an EIT.

[Search Processing]

An improvement in search processing, which is another main feature of the present invention, is next described. This feature facilitates search manipulation by users.

Program search is executable based on EIT information acquired in the digital broadcast receiving device 1. However, it is troublesome for a user to perform a manipulation for inputting a search keyword for a program search. Especially in a vehicle-mounted receiver, it is undesirable to install a keyboard for inputting keywords because of spatial limitations. Functions equivalent to a keyboard may be provided in the switches. For example, as in the case of inputting a destination in a navigation apparatus, it may be possible to provide an input function using an alphabet table. However, the input manipulation becomes more complicated using such an arrangement.

Considering this situation, the present embodiment reduces keyword input manipulation required by a user. To accomplish this, search keywords are extracted from EIT information in the present embodiment. Topic information, which constitute the extended format event descriptor 102 in the EIT information, can be suitably used as keywords. A search screen image including topic information displayed as keywords, and the user selects an appropriate topic information. Programs are searched using the selected topic information as the key. A search result screen image including the searched programs is then displayed.

Figure 24:
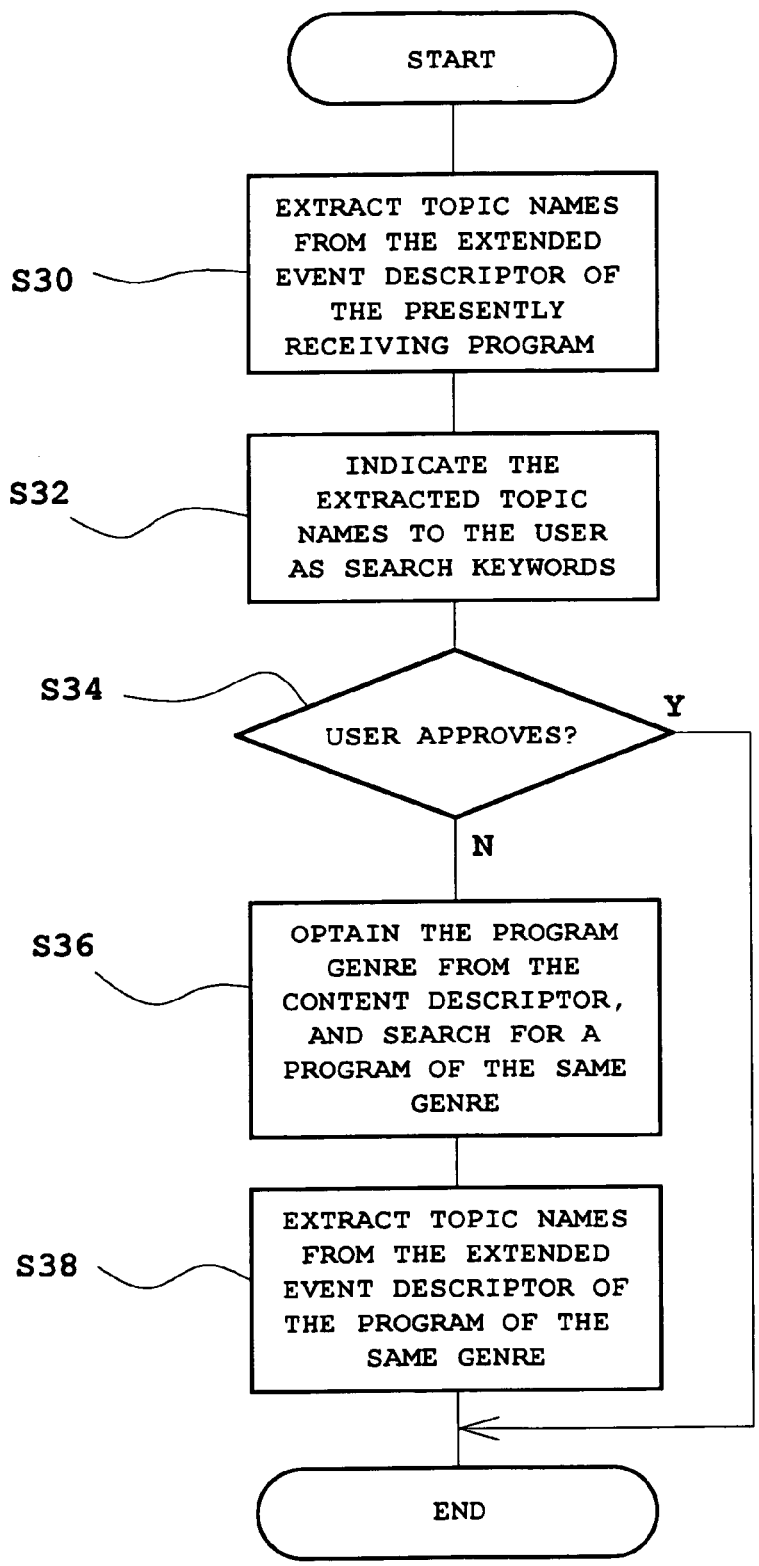
FIG. 24 is a flowchart showing a keyword extracting processing.

FIG. 24 is a flowchart showing one example of specific processing according to the present embodiment. This processing is mainly performed by the EIT analyzer 31 in the control processor 7 and the search processor 35. Topic names are first extracted from the extended event descriptor 102 of the program presently received for listening and/or watching (S30). Subsequently, the extracted topic names are indicated to the user as search keywords (S32). It is then judged whether any one of the indicated topic names have been selected by the user (S34).

When an indicated topic name is appropriate, the user selects the topic name and presses the search start switch (ENTER). As a result, the judgement in S34 is determined to be "yes", and a program search is executed using the selected topic as the keyword.

There may be instances where the topic names indicated as the search keywords do not match the user's request. In such a case, the user operates a predetermined switch (not shown) to request for indication of other keywords. The judgement in S34 is then determined to be "no". In response to the user's request, the genre of the presently receiving program is obtained from the content descriptor 101. When the content descriptor 101 is not available, the genre may be estimated as described above. A program of the same genre is then searched for (S36). When a program of the same genre is found, topic names are extracted from the extended event descriptor 102 of that program and indicated to the user as search keywords (S38). Keywords are successively extracted from other programs until the user approves of a keyword. When the user selects a keyword, a search is executed using the selected keyword.

The above processing is illustrated in the program search screen image I of FIG. 16. This screen image is displayed, for example, when the "program search" switch G5 is operated while in the extended format information indicating screen image G of FIG. 13. A music broadcast is currently being received, and, concerning the receiving content, the song title is BBBB and the singer name is XXXX. This topic information is obtained from the extended event descriptor 102. In the program search screen image I of FIG. 16, this topic information is indicated as search keywords.

For example, the user selects the song title BBBB using the cursor switch 15*d* while in the program search screen image I of FIG. 16. A search for programs that broadcast the song BBBB is then executed, and the search result screen image I of FIG. 17 is displayed. Each of the programs within FIG. 17 includes the song BBBB as part of its topic information.

When the user selects one of the programs in the search result screen image I of FIG. 17, detailed information concerning the selected program is displayed (FIG. 18). The topic that was selected as the search keyword (the song title BBBB) is distinguishably indicated from other topics. In the example of FIG. 18, the selected search keyword is highlighted.

As described above, search keywords are extracted from an EIT information and indicated in the present embodiment. Search keywords are indicated to the user without requiring the user to perform a manipulation such as inputting of a search keyword character by character. The user can select a desired keyword from among the indicated keywords. In this way, manipulation for a search is greatly reduced, facilitating program selection. Especially in the present embodiment, appropriate keywords which are likely to be requested by the user for search use can be automatically indicated because EIT information including description of program contents are used as keywords.

Further, in the present embodiment, when a user is not satisfied with the keywords extracted in association with the presently receiving program, keywords extracted from the supplementary information related to other programs of the same genre are indicated. Even when no appropriate keywords can be obtained from the receiving program, other suitable keywords can be indicated to the user.

According to the present embodiment, in response to a user manipulation instructing a search, the display screen is switched from the screen image of FIG. 13 to the search screen image I of FIG. 16. Specifically, the screen image which indicates topic information concerning a broadcast content is switched directly to the search screen image I including those topic information as search keywords. Accordingly, the user can smoothly use the topics indicated on the topic indicating screen image as search keywords, and easily start the search operation.

Further, in the present embodiment, the above-described priority ranking is also effectively used in search processing. In the search screen image I of FIG. 18, plural topic information serving as search keywords are arranged in order from the highest priority rank. In this way, topics having higher frequency to be selected are indicated near the top. As a result, screen indication is easy to see, and the amount of user manipulation for keyword selection can be reduced. Especially when a large number of topics are present, important topics are prevented from being hidden in the lower portion of a scroll screen image, providing a convenient indication.

In the search result screen image of FIG. 18, information regarding "song title", which is the topic having the highest priority rank in the genre of "music", is displayed. By appropriately restricting the topic in this way, uncomplicated and clearly visible screen indication can be achieved.

[Registering Search Keywords]

In the present embodiment, it is preferable to automatically store search keywords as described below. Automatic registration processing in the following description corresponds to automatic keyword storage of the present invention.

Automatic registration processing is executed by the control processor 7. In the control processor 7, the EIT analyzer 31 analyzes EIT information to obtain various descriptor information. The search processor 35 extracts the topic information in the extended event descriptor information of the program presently received for listening and/or watching, and registers the extracted topic information as search keywords in the keyword storing unit 23 within the memory device 9.

It is, however, not desirable to extract keywords from a program that was temporarily received during the process of selecting a station. The above keyword registration processing is executed under the condition that the program was watched/listened for at least a predetermined period of time.

The same topic information may be extracted as an object of registration a plural number of times. Such can occur when, for example, after the song title AAAA is registered while receiving a particular music program, the song title AAAA is acquired while receiving another music program. Accordingly, a keyword is stored together with a priority degree according to the number of times the keyword was extracted. Priority degree is set higher when a greater number of extractions have been made.

Figure 25:
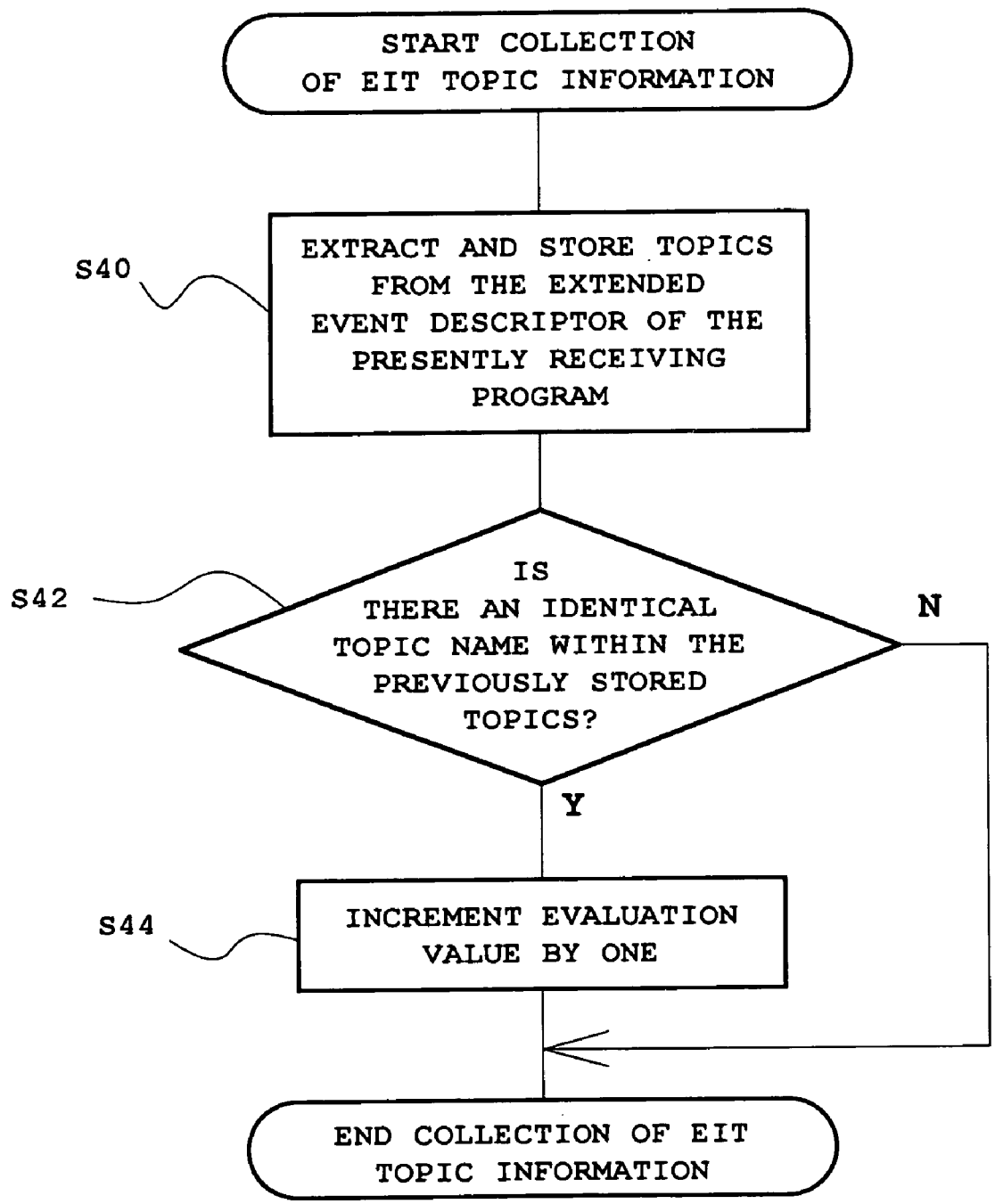
FIG. 25 is a flowchart showing a keyword registering processing.

FIG. 25 is a flowchart showing an example of the above keyword storing processing. A topic information in the extended format event descriptor 102 of the presently receiving program is extracted and registered (S40). When storing, it is determined whether there exists the same topic item within the previously stored topic items (S42). When S42 is "yes", new registration is not made. Instead, the evaluation value of the corresponding topic item is incremented by one (S44). When the judgement in S42 is "no", the topic item is automatically registered as a new keyword.

The above-mentioned evaluation value is stored for each keyword. The evaluation value is used as the priority degree of the keyword. A priority rank may be designated for each keyword in order from the keyword having the highest evaluation value, and stored in correlation with the keyword.

Search processing using the registered keywords is next described. When the user instructs indication of the search screen image I, keywords stored in the search keyword storing unit 33 are read out, and listed in the search screen image I in of priority rank. In the present embodiment, the number of displayed keywords is restricted to a predetermined number. Accordingly, the predetermined number of keywords from the top of the priority ranking are displayed.

Figure 26:
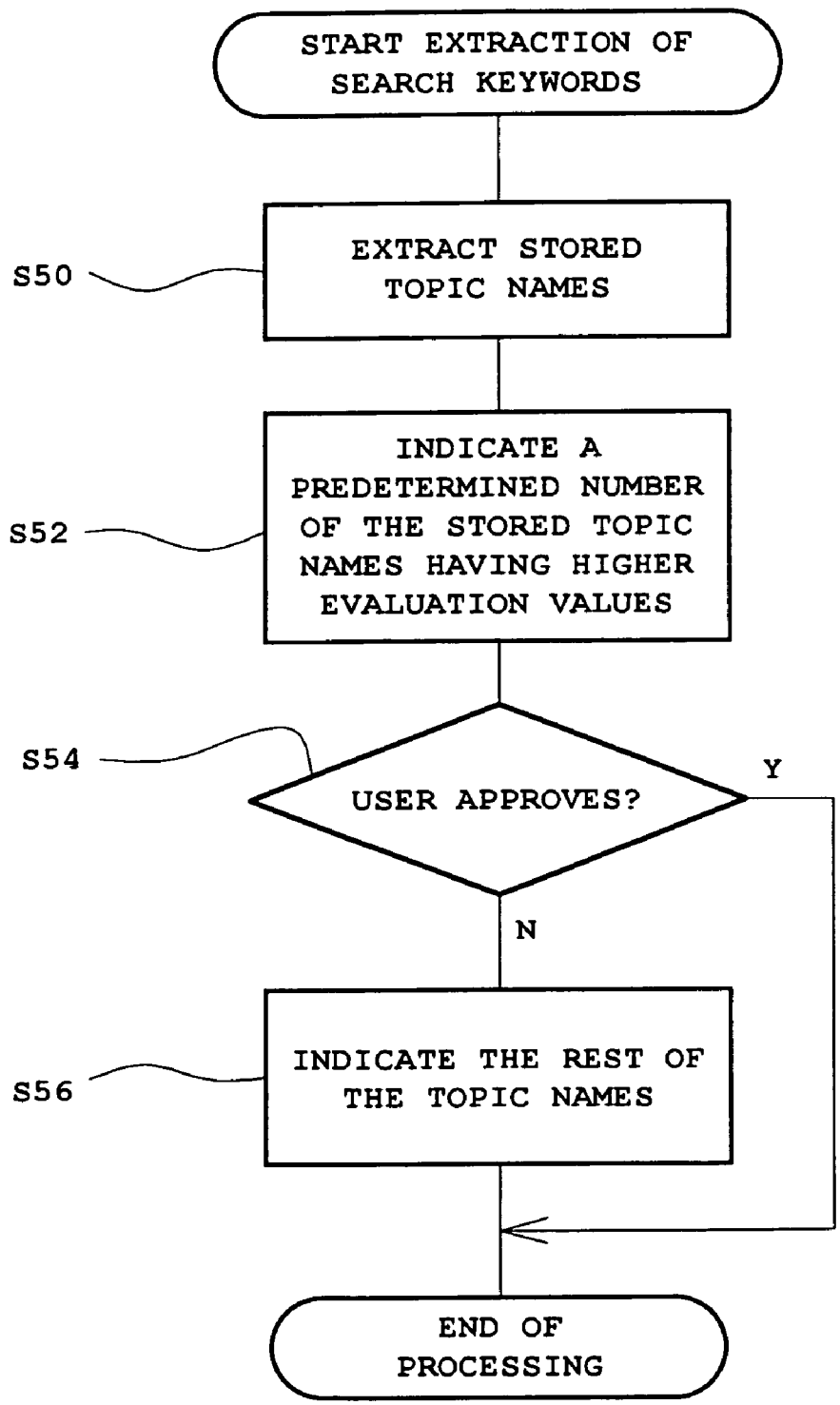
FIG. 26 is a flowchart showing a processing for indicating registered keywords.

FIG. 26 is a flowchart showing an example of the above processing. When the user instructs indication of the search screen image, the stored topics (keywords) are extracted (S50). A predetermined number of the extracted keywords from the top of the priority ranking are sequentially displayed (S52). It is then determined whether the user approves any of the displayed keywords (S54).

When a displayed topic item is appropriate, the user selects the topic item and instructs start of a search. The judgement in S54 is then determined to be "yes", and a program search is executed using the selected topic as the keyword.

There may be a case where the topic items indicated as the search keywords do not match the user's request. In this case, the user operates a predetermined switch (not shown) to request indication of other keywords. The judgement in S54 is then determined to be "no". In response to the user's request, the remaining keywords are displayed. The keywords are again displayed in order from the keyword having the highest evaluation value. The keywords that do not fit in the screen image are displayed so as to appear from the bottom portion of the screen image according to scrolling manipulation by the user. When the user selects a keyword, that keyword is used to execute a program search.

As described above, an increased number of keywords for search use is made available in the present embodiment by automatic storage of search keywords. Specifically, not only the topic information obtained from the presently receiving program, but also those obtained from the programs which the user watched/listened to in the past can be used as keywords.

In the present embodiment, a keyword priority degree (evaluation value) is changed according to the number of extractions made with respect to the corresponding topic. Using this procedure, keywords can be offered in accordance with the user's program viewing/listening frequency. For example, if the user frequently receives music programs, keywords related to music are recorded together with high evaluation values. When songs of a particular singer are frequently received in the music programs, the singer's name is recorded as a keyword together with a high evaluation value. Accordingly, even when a search is to be executed while receiving a program of a different genre, the singer's name in the genre of music, which is in accordance with the user's tastes, can be displayed as a keyword near the top of the list.

In this way, appropriate keywords according to individual users can be offered in the present embodiment.

[Switching Keyword Modes]

Two types of keyword indication processing have been explained for the present embodiment. One is the processing of FIG. 24, and the other is the processing of FIGS. 25 and 26. In the processing of FIG. 24, topic information obtained from the presently receiving program is indicated to the user (receiving program keyword indicating mode). In the other mode, topic information registered as keywords based on the receiving history is indicated to the user (registered keyword indicating mode). In the latter mode, registered keywords are indicated according to priority degrees. It is preferable to configure the receiving device such that these two indication modes can be switched. More specifically, a keyword indication mode converting switch is set as a function switch in the search screen. Using this switch, indication of keywords in the search screen image can be switched from the keywords obtained from the receiving program to the registered keywords, and vice versa.

The following advantage can be accomplished by this mode switching. For example, the default setting is the receiving program keyword indicating mode. At the start of a search, keywords useful in searching for programs similar to the receiving program are indicated to the user. As it is very likely that the user is receiving a program that he or she enjoys, keywords can be indicated with a high probability of appropriateness.

However, the program the user was receiving may not have been one that he or she enjoyed, or the user may wish to watch or listen to a program of a different genre. In such a case, the user performs a manipulation for mode switching. As a result, the registered keywords are indicated according to the priority degrees. In other words, keywords related to programs that the user typically watches or listens to are indicated.

In this way, appropriate keywords in line with the user's request can be indicated by switching between the two modes. Furthermore, the present embodiment is advantageous in that appropriate keywords can be supplied plentifully even on a small display screen of a vehicle-mounted device.

The preferred embodiment of the present invention has been described above. While in the present embodiment, the present invention was implemented in a receiving device compatible to MPEG2, the present invention is not limited to such an embodiment. When an appropriate supplementary information can be obtained, the present invention may be used for a digital broadcast of any other format or even for an analog broadcast.

The present invention is not limited to implementation in a vehicle-mounted receiving device, and can be applied in any arbitrary receiving device. However, the advantages of the present invention are especially noticeable in a small-size receiving device such as a vehicle-mounted receiving device and a portable receiving device, because spatial limitations on the display area and manipulation units are imposed to a higher degree in such a device.

Furthermore, the present invention may be actualized in the form of a method or a recording medium, as well as a device. When configured as a recording medium, a program for instructing a computer to execute the processing of the present invention is recorded in the recording medium. It is possible to incorporate a program for actualizing the processing of the present invention into a program for analyzing and processing supplementary information such as an EIT information. The recording medium is an arbitrary medium readable by a computer via electric, magnetic, optical, or other means. In the example device of FIG. 1, the control processor corresponds to the computer. The recording medium may be included in the memory device, or, alternatively, in the computer.

Figure 27:
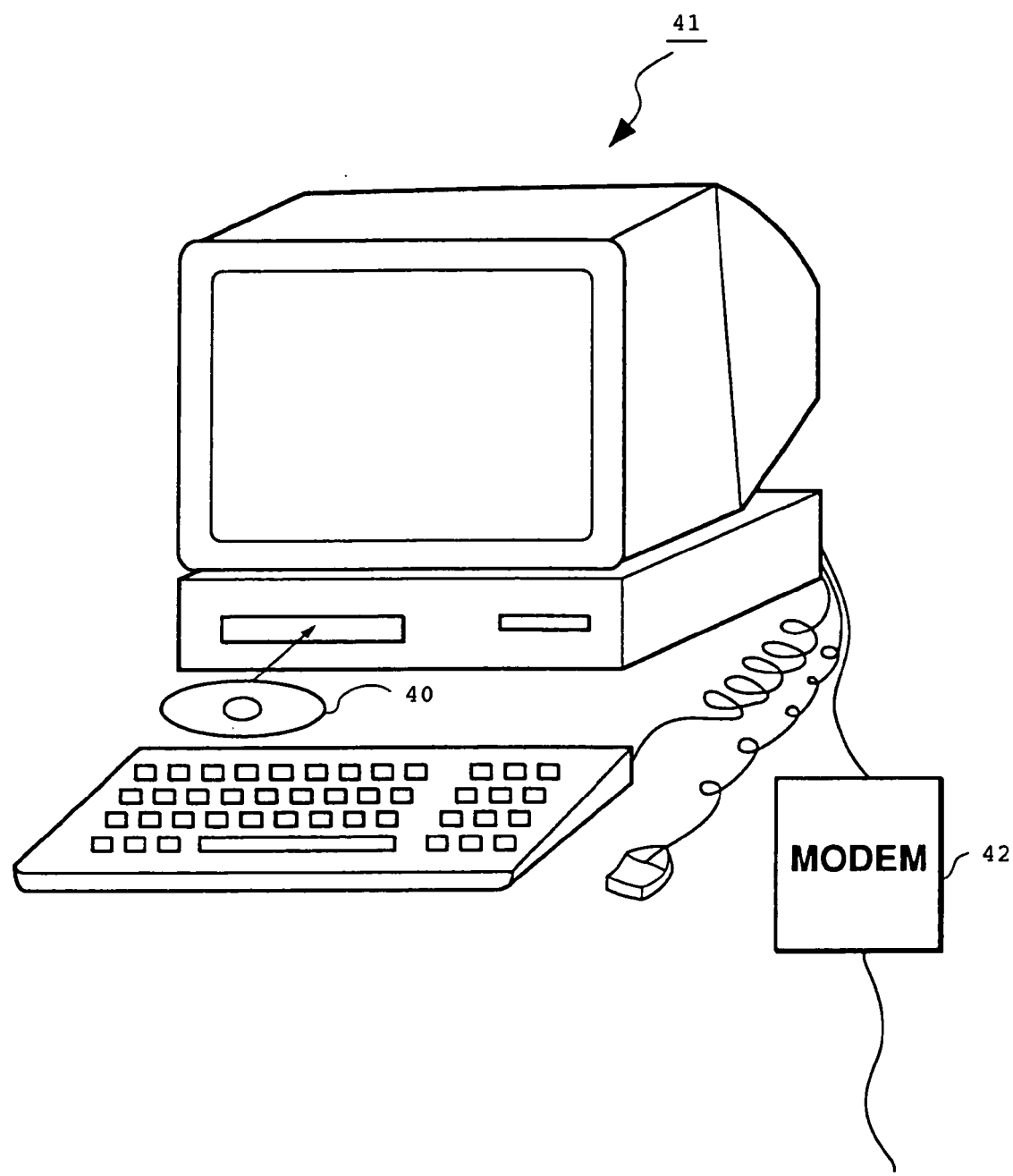
FIG. 27 is an illustration showing the case when the processing performed in a broadcast receiving device is stored in a storage device and executed by a computer.

FIG. 27 is an example in which a broadcast receiving device is configured by installing a processing program or the like in a computer 41 using a CD-ROM 40. Other than CD-ROM, the recording medium may comprise a floppy disk, magnetic disk, magnetic tape, RAM, flash memory, optical disk, DVD, or other similar devices. In this example, a digital broadcast signal is received via a modem 42.

According to the present invention as described above, supplementary information transmitted together with broadcast contents can be displayed in an easily understandable manner. Furthermore, the present invention facilitates manipulation of a receiver in using the supplementary information, or, more specifically, manipulation for performing a program search.

What is claimed is:

1. A broadcast receiving device, comprising:

a supplementary information acquiring means for acquiring supplementary information transmitted together with broadcast content;

a display means for displaying said supplementary information;

a processing means for processing said supplementary information for displaying on said display means; and a memory means for storing, separately for each genre of broadcast contents, a degree of display priority for each of plural types of topic information related to description of a broadcast content using a priority ranking table, separately provided for each genre, defining priority ranking related to display of a plurality of topics of a single program which are to be displayed on a screen; wherein said processing means obtains genre information and topic information from said acquired supplementary information, and displays said topic information separately for each genre on said display means according to said display priority degree defined in said priority ranking table stored in said memory means corresponding to the obtained genre information.

2. The broadcast receiving device as defined in claim 1, further comprising:
   a means for a user to input a selection of a topic to be displayed; and
   a selection frequency storing unit for storing a frequency of selection by the user for each topic in each genre; wherein
   a display priority degree stored in said memory means for storing the degree of display priority is changed according to said selection frequency.

3. The broadcast receiving device as defined in claim 1, wherein
   when no genre information is included in said supplementary information, said processing means estimates a genre from said topic information, and displays said topic information according to said display priority degree based on the estimated genre.

4. The broadcast receiving device as defined in claim 1, wherein
   said processing means includes a search processing means which displays a program search screen image on said display means, said program search screen image sequentially indicating, as search keywords used for program search, said topic information included in said supplementary information in order from the highest display priority degree.

5. The broadcast receiving device as defined in claim 1, wherein said supplementary information is a program sequence information of a digital broadcast.

6. the broadcast receiving device as defined in claim 1, wherein said supplementary information includes an extended format event descriptor.

7. The broadcast receiving device as defined in claim 1, wherein said supplementary information includes a content descriptor.

8. The broadcast receiving device as defined in claim 1, wherein said supplementary information includes a short format event descriptor.

9. A broadcast receiving device, comprising:
   a supplementary information acquiring means for acquiring supplementary information transmitted together with broadcast content;
   a display means for displaying said supplementary information;
   a processing means for processing said supplementary information for displaying on said display means; and
   a keyword storing means for storing automatically by said processing means, as a search keyword, topic information included in supplementary information corresponding to a program watched or listened to by a user; wherein
   said processing means includes a search processing means for extracting from said keyword storing means search keyword used for program search, displaying on said display means a program search screen image including the extracted search keyword, and displaying on said display means a search result screen image based on a program search using a search keyword selected by the user.

10. The broadcast receiving device as defined in claim 9, wherein
    said search processing means extracts, as said search keyword, topic information included in said supplementary information and related to description of the broadcast content.

11. The broadcast receiving device as defined in claim 9, wherein
    when the user instructs a search while a topic information related to description of said broadcast content is displayed, displayed image is switched to a program search screen image including said topic information as a search keyword.

12. The broadcast receiving device as defined in claim 9, wherein
    said keyword storing means stores, in correlation with each corresponding topic information, a keyword priority degree according to a number of times of topic information extraction; and
    said search processing means displays the stored topic information on the program search screen image according to said keyword priority degree.

13. The broadcast receiving device as defined in claim 9, further comprising:
    a keyword mode switching means for switching between a receiving program keyword indicating mode in which a topic information within a supplementary information corresponding to a program presently received for listening and/or watching is displayed as a search keyword on the program search screen image, and a registered keyword indicating mode in which a topic information stored in said keyword storing means as a search keyword is indicated on the program search screen image.

14. The broadcast receiving device as defined in claim 9, wherein said supplementary information is a program sequence information of a digital broadcast.

15. The broadcast receiving device as defined in claim 9, wherein said supplementary information includes an extended format event descriptor.

16. The broadcast receiving device as defined in claim 9, wherein said supplementary information includes a content descriptor.

17. The broadcast receiving device as defined in claim 9, wherein said supplementary information includes a short format event descriptor.

18. A program storage device readable by a machine, tangibly embodying a program of instructions executable by the machine to perform method steps for processing a received broadcast signal, said method steps comprising steps of:
    acquiring supplementary information transmitted together with the broadcast content;
    obtaining from said acquired supplementary information a genre information and topic information related to description of said broadcast content;
    reading out from a memory means a degree of display priority for each of plural types of topic information, using a priority ranking table separately provided for each genre, defining priority ranking related to display of a plurality of topics of a single program which are to be displayed on a screen; and
    displaying on a display means separately for each genre said topic information obtained from said supplementary information according to said display priority degree defined in said priority ranking table stored in said memory means corresponding to the genre information obtained from said supplementary information.

19. The storage device as defined in claim 18, wherein said storage device is readable by a computer for a receiver.

20. A program storage device readable by a machine, tangibly embodying a program of instructions executable by the machine to perform method steps for processing a received broadcast signal, said method steps comprising steps of:

acquiring from a broadcast signal supplementary information transmitted together with the broadcast content;

extracting from said supplementary information a search keyword used for program search;

automatically storing in keyword storing means, as a search keyword, topic information included in supplementary information corresponding to a program watched or listened to by the user;

searching so as to extract from said keyword storing means a search keyword used for program search;

displaying on said display means a program search screen image including the extracted search keyword; and displaying on said display means a search result screen image based on a program search using a search keyword selected by a user.

21. The storage device as defined in claim 20, wherein said storage device is readable by a computer for a receiver.

\* \* \* \* \*